United States Patent
Yoon et al.

(10) Patent No.: US 10,547,367 B2
(45) Date of Patent: Jan. 28, 2020

(54) METHOD FOR TRANSMITTING AND RECEIVING REFERENCE SIGNAL AND APPARATUS THEREFOR

(71) Applicant: LG Electronics Inc., Seoul (KR)

(72) Inventors: Sukhyon Yoon, Seoul (KR); Hyunsoo Ko, Seoul (KR); Kijun Kim, Seoul (KR); Eunsun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/085,161

(22) PCT Filed: Aug. 10, 2018

(86) PCT No.: PCT/KR2018/009180
§ 371 (c)(1),
(2) Date: Sep. 14, 2018

(87) PCT Pub. No.: WO2019/031917
PCT Pub. Date: Feb. 14, 2019

(65) Prior Publication Data
US 2019/0074886 A1 Mar. 7, 2019

Related U.S. Application Data

(60) Provisional application No. 62/556,513, filed on Sep. 11, 2017, provisional application No. 62/544,216, filed on Aug. 11, 2017.

(51) Int. Cl.
*H04L 12/28* (2006.01)
*H04B 7/06* (2006.01)
(Continued)

(52) U.S. Cl.
CPC ......... *H04B 7/0626* (2013.01); *H04B 7/0617* (2013.01); *H04B 17/318* (2015.01);
(Continued)

(58) Field of Classification Search
CPC .... H04B 7/0626; H04B 17/318; H04B 7/024; H04W 24/10
(Continued)

(56) References Cited

U.S. PATENT DOCUMENTS

2015/0117351 A1* 4/2015 Nagata ..................... H04J 1/00
370/329
2016/0013984 A1* 1/2016 Sun ....................... H04W 24/08
370/252
(Continued)

FOREIGN PATENT DOCUMENTS

| KR | 1020130087972 | 8/2013 |
| WO | WO2014109589 | 7/2014 |
| WO | WO2016006886 | 1/2016 |

OTHER PUBLICATIONS

NTT DOCOMO, R1-1711070, Discussion on NR RRM measurement based on CSI-RS for L3 mobility, 3GPP TSG RAN WG1 #AH, Jun. 17, 2017. See section 1-3. (Year: 2017).*
ZTE, R1-1709899, RRM measurements on CSI-RS for L3 mobility, 3GPP TSG RAN WG1 #AH, Jun. 17, 2017. See section 2-4, 6. (Year: 2017).*
Ericsson, R1-1700766, on CSI-RS design, 3GPP TSG RAN WG1 #AH, Jan. 10, 2017. See section 1-2. (Year: 2017).*
(Continued)

*Primary Examiner* — John Pezzlo
(74) *Attorney, Agent, or Firm* — Fish & Richardson P.C.

(57) ABSTRACT

The present disclosure provides a method for receiving a channel state information-reference signal (CSI-RS) by a UE in a wireless communication system. Particularly, the method includes receiving information on a measurement bandwidth and cell list information for a plurality of cells, receiving CSI-RSs of the plurality of cells, and measuring reception power for the CSI-RSs within the measurement bandwidth, wherein sequences of the CSI-RSs are mapped to physical resources based on the same reference position configured by a higher layer.

11 Claims, 14 Drawing Sheets

(51) Int. Cl.
*H04L 5/00* (2006.01)
*H04B 17/318* (2015.01)
*H04W 48/10* (2009.01)
*H04J 1/16* (2006.01)
*H04B 7/024* (2017.01)
*H04W 48/12* (2009.01)
*H04B 7/0456* (2017.01)
*H04W 24/10* (2009.01)

(52) U.S. Cl.
CPC .......... *H04L 5/0048* (2013.01); *H04L 5/0091* (2013.01); *H04W 48/10* (2013.01); *H04B 7/024* (2013.01); *H04B 7/0478* (2013.01); *H04B 7/065* (2013.01); *H04W 24/10* (2013.01); *H04W 48/12* (2013.01)

(58) Field of Classification Search
USPC ................................ 370/252, 329, 386, 430
See application file for complete search history.

(56) References Cited

U.S. PATENT DOCUMENTS

2016/0028463 A1* 1/2016 Wang .................... H04L 5/0023
370/329
2016/0227427 A1* 8/2016 Vajapeyam ......... H04W 72/085

OTHER PUBLICATIONS

CATT, "Considerations on CSI-RS based RSRP measurement," R1-122041, 3GPP TSG RAN WG1 Meeting #69, Prague, Czech Republic, May 21-25, 2012, 4 pages.
Nokia Corporation, Nokia Siemens Networks, "Size of CoMP measurement set for per-CSI-RS-resource CSI feedback," R1-122407, 3GPP TSG-RAN WG1 Meeting #69, Prague, Czech Republic, May 21-25, 2012, 4 pages.

* cited by examiner

FIG. 1
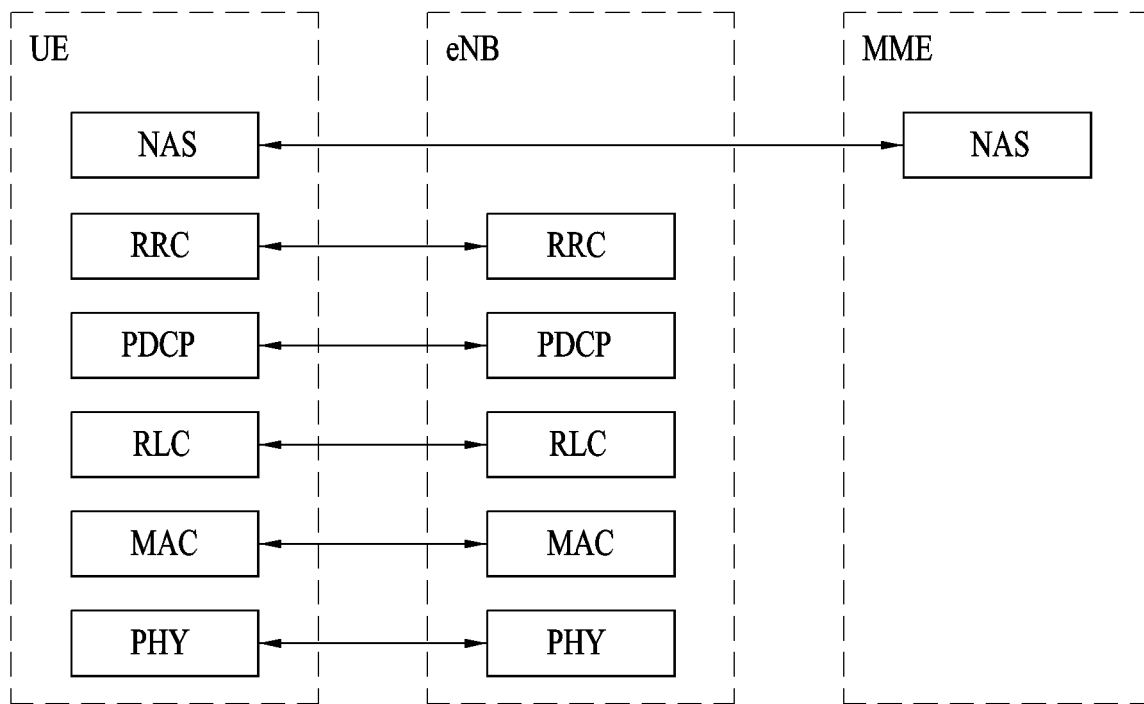
(A) CONTROL-PLANE PROTOCOL STACK
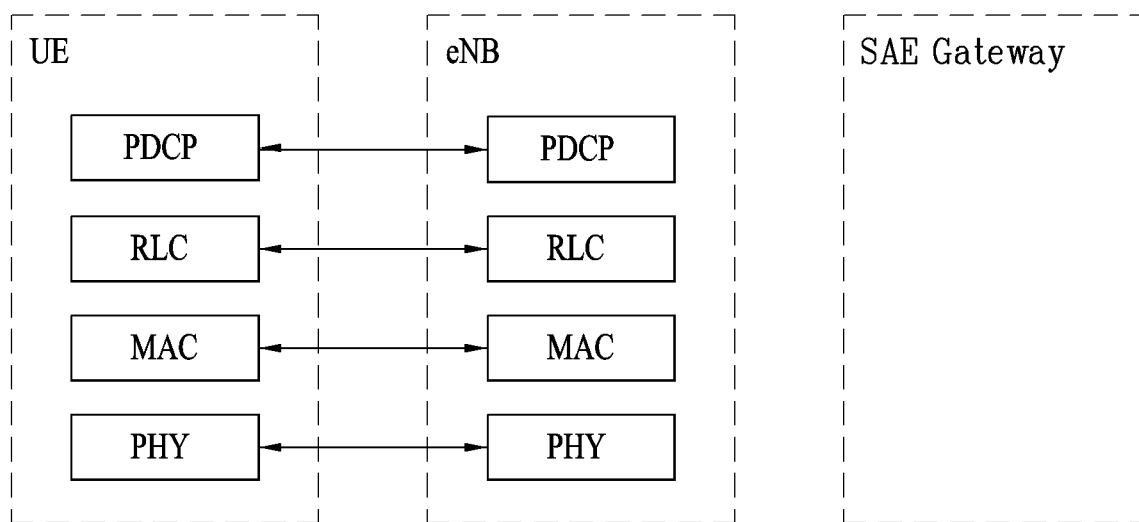
(B) USER-PLANE PROTOCOL STACK (a)  (b)

METHOD FOR TRANSMITTING AND RECEIVING REFERENCE SIGNAL AND APPARATUS THEREFOR

CROSS-REFERENCE TO RELATED APPLICATIONS

This application is a National Stage application under 35 U.S.C. § 371 of International Application No. PCT/KR2018/009180, filed on Aug. 10, 2018, which claims the benefit of U.S. Provisional Application No. 62/556,513, filed on Sep. 11, 2017, and U.S. Provisional Application No. 62/544,216, filed on Aug. 11, 2017. The disclosures of the prior applications are incorporated by reference in their entirety.

TECHNICAL FIELD

The present disclosure relates to a method for transmitting and receiving a reference signal and an apparatus therefor, and more specifically, to a method of setting a reference position for mapping a sequence of a CSI-RS (Channel State Information-Reference Signal) and an apparatus therefor.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)). traffic according to the current trends, a next-generation 5G system which is a wireless broadband communication system evolving from LTE is required. In such a next-generation 5G system called NewRAT, communication scenarios are divided into enhanced mobile broadband (eMBB), ultra-reliability and low-latency communication (URLLC), massive machine-type communications (mMTC), etc.

DISCLOSURE

Technical Problem

An object of the present disclosure is to provide a method for transmitting and receiving a reference signal and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

A method for receiving a channel state information-reference signal (CSI-RS) by a UE in a wireless communication system according to an embodiment of the present disclosure includes: receiving information on a measurement bandwidth and cell list information for a plurality of cells; receiving CSI-RSs of the plurality of cells; and measuring reception power for the CSI-RSs within the measurement bandwidth, wherein sequences of the CSI-RSs are mapped to physical resources based on the same reference position configured by a higher layer.

Here, each of the sequences of the CSI-RSs may be generated based on the same reference position.

Further, a subcarrier to which the first element of each of the sequences of the CSI-RSs is mapped may be a subcarrier corresponding to the same reference position.

Further, the method may include reporting information about reception power of at least one of the plurality of cells.

Further, each of the sequences of the CSI-RSs may be generated based on a scrambling ID of a corresponding cell configured by the higher layer.

Further, the information on the measurement bandwidth may include information on the starting resource block (RB) of the measurement bandwidth.

A UE receiving a channel state information-reference signal (CSI-RS) in a wireless communication system according to the present disclosure includes: a transceiver for transmitting/receiving signals to/from a base station; and a processor for controlling the transceiver, wherein the processor is configured: to control the transceiver to receive information on a measurement bandwidth and cell list information for a plurality of cells and to control the transceiver to receive CSI-RSs of the plurality of cells; and to measure reception power for the CSI-RSs within the measurement bandwidth, wherein sequences of the CSI-RSs are mapped to physical resources based on the same reference position configured by a higher layer.

Here, each of the sequences of the CSI-RSs may be generated based on the same reference position.

Further, a subcarrier to which the first element of each of the sequences of the CSI-RSs is mapped may be a subcarrier corresponding to the same reference position.

Further, the processor may control the transceiver to report information on reception power of at least one of the plurality of cells.

Further, each of the sequences of the CSI-RSs may be generated based on a scrambling ID of a corresponding cell configured by the higher layer.

Further, the information on the measurement bandwidth may include information on the starting resource block (RB) of the measurement bandwidth.

Advantageous Effects

According to the present disclosure, it is possible to alleviate a problem of collision between CSI-RS sequences due to different BWPs (Bandwidth parts) set for cells.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 is a view illustrating the control-plane and user-plane architecture of radio interface protocols between a user equipment (UE) and an evolved UMTS terrestrial radio access network (E-UTRAN) in conformance to a 3$^{rd}$ generation partnership project (3GPP) radio access network standard.

BEST MODE

Figure 2:
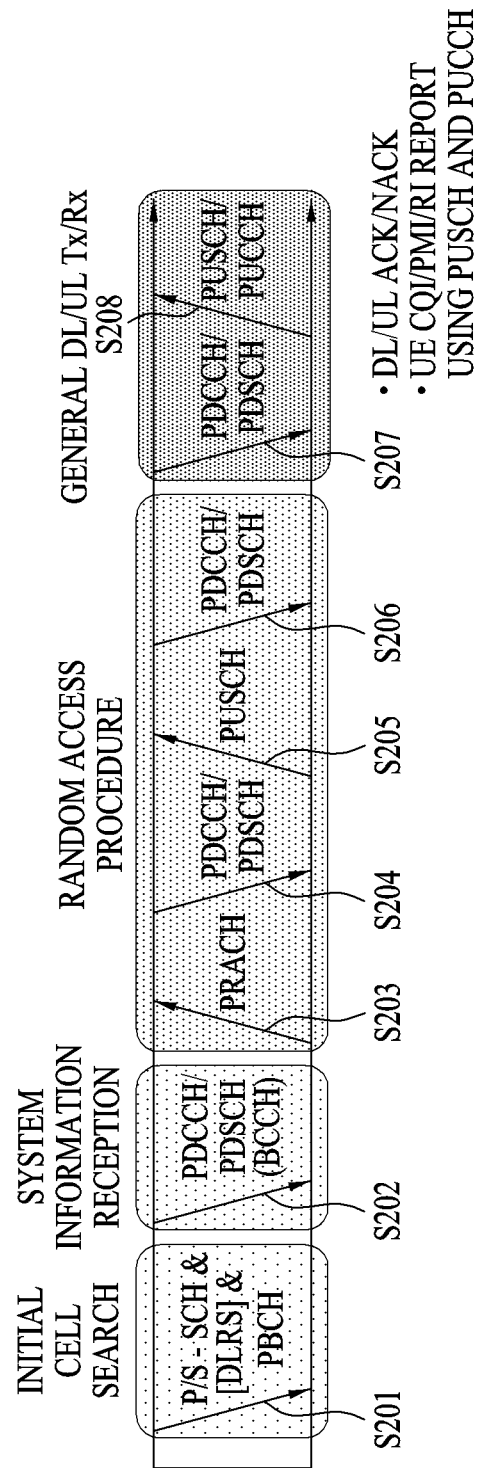
FIG. 2 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3$^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/

TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
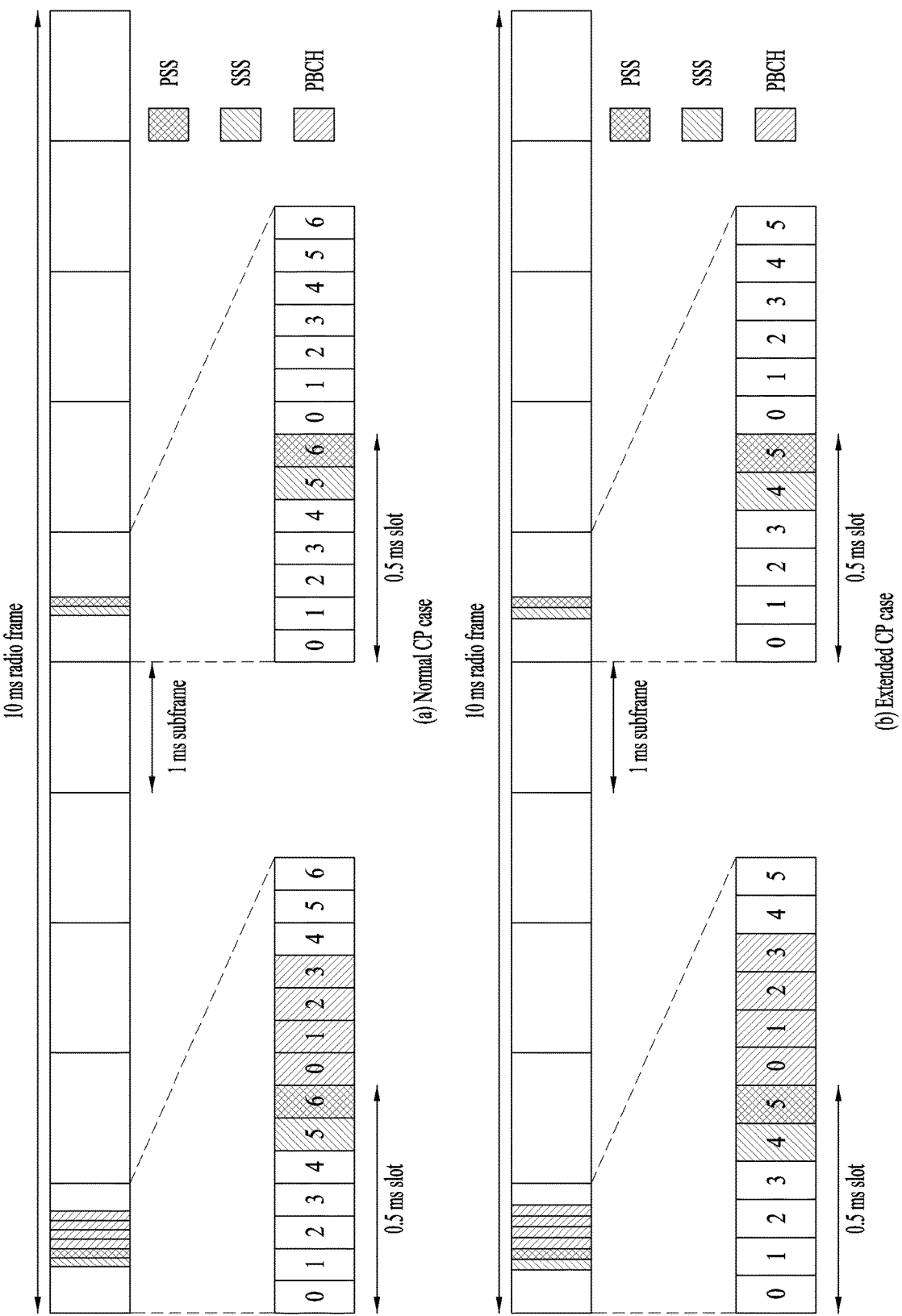
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b) shows positions at which the SS and the PBCH are transmitted in a radio frame configured by an extended CP.

Figure 4:
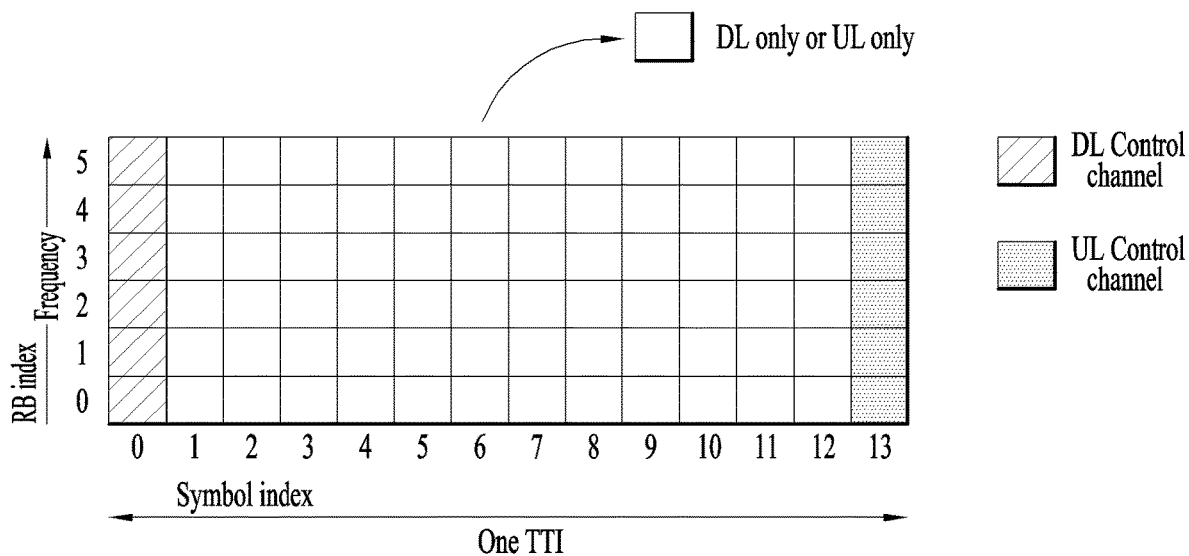
FIG. 4 is a view illustrating an exemplary slot structure available in new radio access technology (NR).

An SS will be described in more detail with reference to FIG. 3. An SS is categorized into a primary synchronization signal (PSS) and a secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention-based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
  Step 2: Random access response (RAR) (via PDCCH and PDSCH (eNB to)
  Step 3: Layer 2/Layer 3 message (via PUSCH) (UE to eNB)
  Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)

Step 1: RACH preamble (via PRACH) (UE to eNB)

Step 2: Random access response(RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

<Radio Resource Management (RRM) Measurement in LTE>

The LTE system supports RRM operation including power control, scheduling, cell search, cell reselection, handover, radio link or connection monitoring, and connection establishment and re-establishment. In this case, a serving cell may request a UE to send RRM measurement information corresponding to a measurement value for performing the RRM operation. In particular, in the LTE system, the UE may measure cell search information, Reference Signal Received Power (RSRP), Reference Signal Received Quality (RSRQ), and the like for each cell and then report the measured information. Specifically, in the LTE system, the UE receives 'measConfig' for RRM measurement from a serving cell through a higher layer signal and then measure RSRP or RSRQ according to information in 'measConfig'. The RSRP and RSRQ are defined as follows in TS 36.214.

RSRP: RSRP is defined as the linear average over the power contributions ([W]) of the Resource Elements (REs) of Cell-specific Reference Signals (CRSs) transmitted in the measurement frequency bandwidth. For RSRP determination, CRS R0 according TS 36.211 may be used. In some cases, CRS R1 may be additionally used to improve reliability. The reference point for the RSRP should be an antenna connector of a UE. If receiver diversity is in use, a reported RSRP value shall not be lower than RSRP of anyone of individual diversities.

RSRQ: RSRQ is defined as N*RSRP/(E-UTRA carrier RSSI), where N is the number of RBs in E-UTRA carrier RSSI measurement bandwidth. In this case, the measurement of 'N*RSRP' and 'E-UTRA carrier RSSI' may be made over the same RB set.

E-UTRA Carrier RSSI is defined as the linear average of the total received power measured only in OFDM symbols containing reference symbols for antenna port 0 on N RBs obtained from all sources including co-channel serving and non-serving cells, adjacent channel interference, thermal noise etc.

If higher layer signaling indicates specific subframes for performing RSRP measurement, RSSI is measured over all indicated OFDM symbols. The reference point for the RSRQ should be an antenna connector of a UE. If receiver diversity is in use, a reported RSRQ value shall not be lower than RSRQ of anyone of individual diversities.

RSSI: RSSI means received wide band power including noise and thermal noise generated within bandwidth defined by a receiver pulse shaping filter. Even in this case, the reference point for the RSSI should be an antenna connector of a UE. If receiver diversity is in use, a reported RSSI value shall not be lower than RSSI of anyone of individual diversities.

Based on the definitions, in the case of intra-frequency measurement, a UE operating in the LTE system is allowed to measure RSRP in bandwidth corresponding to one of 6, 15, 25, 50, 75, 100 RBs by the allowed measurement bandwidth related Information Element (IE) transmitted in System Information Block type 3 (SIB3). Meanwhile, in the case of inter-frequency measurement, the UE is allowed to measure RSRP in bandwidth corresponding to one of 6, 15, 25, 50, 75, 100 RBs by the allowed measurement bandwidth related IE transmitted in SIB5. Alternatively, when there is no IE, the UE may measure RSRP in the entire downlink system frequency band as the default operation. Upon receiving information on the allowed measurement bandwidth, the UE may consider the corresponding value as the maximum measurement bandwidth and then freely measure the RSRP value within the corresponding value.

However, if the serving cell transmits the IE defined as WB-RSRQ and sets the allowed measurement bandwidth equal to or more than 50 RBs, the UE should calculate the RSRP value for the entire allowed measurement bandwidth. Meanwhile, in the case of RSSI, the UE measures RSSI within the frequency band of the UE's receiver according to the definition of RSSI bandwidth.

The NR communication system should provide much better performance than the conventional 4G system in terms of data rates, capacity, latency, energy consumption, and costs. In other words, it is necessary to further improve the bandwidth, spectral energy, signaling efficiency, and cost-per-bit of the NR system.

<Channel State Information (CSI) Report>

In LTE, there are two transmission schemes: open-loop MIMO operating without channel information; and closed-loop MIMO operating based on channel information. Particularly, in closed-loop MIMO, an eNB and a UE may perform beamforming on the basis of channel state information in order to obtain a multiplexing gain of MIMO antennas. The eNB transmits a reference signal to the UE in order to obtain channel state information from the UE and instructs the UE to feed back channel state information measured on the basis of the reference signal through a PUCCH (Physical Uplink Control Channel) or a PUSCH (Physical Uplink Shared Channel).

CSI is divided into an RI (Rank Indicator), a PMI (Precoding Matrix Index) and a CQI (Channel Quality Indication). The RI is rank information of a channel, as described above, and indicates the number of streams that can be received by a UE through the same frequency-time resource. In addition, the RI is determined by long term fading of the channel and thus is fed back to an eNB in a longer period than PMI and CQI values.

The PMI is a value which reflects spatial characteristics of a channel and indicates a precoding matrix index of an eNB preferred by a UE on the basis of metric such as an SINR. Finally, the CQI is a value indicating a channel intensity and refers to a reception SINR which can be obtained by an eNB when the eNB uses a PMI.

In an enhanced communication system such as LTE-A, additional multi-user diversity is obtained using MU-MIMO (multi-user MIMO). Since interference occurs between multiplexed UEs in the antenna domain in MU-MIMO, whether CSI is accurate may affect interference of multiplexed UEs as well as a UE which has reported the CSI. Accordingly, more accurate CSI reporting is required in MU-MIMO than in SU-MIMO.

Accordingly, in LTE-A, PMIs are designed in such a manner that a final PMI is divided into W1, which is a long-term and/or wideband PMI, and W2, which is a short-term and/or sub-band PMI.

As an example of hierarchical codebook transformation which constitutes a final PMI from the aforementioned information W1 and W2, a long-term covariance matrix of a channel, as represented by Equation 1, may be used.

$$W = \text{norm}(W1 W2) \quad \text{[Equation 1]}$$

In Equation 1, W2 is a short-term PMI and is a codeword of a codebook configured to reflect short-term channel information, W is a codeword of a final codebook, and norm (A) refers to a matrix in which the norm of each column of matrix A is normalized to 1.

Specific structures of W1 and W2 are as represented by Equation 2.

$$W1[i] = \begin{bmatrix} X_i & 0 \\ 0 & X_i \end{bmatrix}, \text{ where } X_i \text{ is } Nt/2 \text{ by } M \text{ matrix.} \quad \text{[Equation 2]}$$

$$W2(j) = \begin{bmatrix} \overbrace{e_M^k \quad e_M^l \quad \cdots \quad e_M^m}^{r \text{ columns}} \\ \alpha_j e_M^k \quad \beta_j e_m^l \quad \gamma_j e_M^m \end{bmatrix} \text{ (if rank = } r\text{)},$$

where $1 \leq k, l, m \leq M$ and $k, l, m$ are integer.

In Equation 2, the codeword has been designed based on correlation of channels generated when a cross-polarized antenna is used and an antenna spacing is narrow, for example, when a spacing between neighbor antennas is half a signal wavelength or less. In the case of a cross-polarized antenna, antennas can be divided into a horizontal antenna group and a vertical antenna group. Each antenna group has ULA (uniform linear array) antenna characteristics and the two antenna groups are co-located.

Accordingly, a correlation between antennas of each group has the same linear phase increment characteristic and a correlation between antenna groups has a phase rotation characteristic. In conclusion, it is necessary to design a codebook by reflecting channel characteristics because a codebook contains values obtained by quantizing channels. For convenience of description, a rank-1 codeword generated in the above-described structure may be represented by Equation 3.

$$W1(i) * W2(j) = \begin{bmatrix} X_i(k) \\ \alpha_j X_i(k) \end{bmatrix} \quad \text{[Equation 3]}$$

In Equation 3, the codeword is represented by a vector of the number $N_T \times 1$ of Tx antennas and structured as an upper vector $X_i(k)$ and a lower vector $\alpha_j X_i(k)$ which respectively indicate correlation characteristics of a horizontal antenna group and a vertical antenna group. It is advantageous to represent $X_i(k)$ as a vector having a linear phase increment characteristic by reflecting a correlation between antennas of each antenna group, and a DFT matrix may be used as a typical example.

In an enhanced communication system such as LTE-A, additional multi-user diversity is obtained using MU-MIMO (multi-user MIMO). Since interference occurs between multiplexed UEs in the antenna domain in MU-MIMO, whether CSI is accurate may affect interference of multiplexed UEs as well as a UE which has reported the CSI. Accordingly, more accurate CSI reporting is required in MU-MIMO than in SU-MIMO.

In addition, CoMP JT may be regarded as a MIMO system in which antennas are theoretically geographically distributed because a plurality of eNBs transmits the same data to a specific UE in a coordinated manner in CoMP JT. That is, when MU-MIMO is performed in JT, channel state information with high accuracy is also required in order to avoid interference between UEs scheduled in a coordinated manner as in single-cell-MU-MIMO. In the case of CoMP CB, accurate channel state information is also required in order to avoid interference applied by a neighbor cell to a serving cell. To increase accuracy of channel state information feedback, an additional channel state information feedback report of a UE is required, in general, and the additional channel state information feedback report is transmitted to an eNB through a PUCCH or a PUSCH.

<Reference Signal>

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

<OFDM Numerology>

A New RAT system adopts an OFDM transmission scheme or a transmission scheme similar to the OFDM transmission scheme. The New RAT system may use different OFDM parameters from LTE OFDM parameters. Or the New RAT system may follow the numerology of legacy LTE/LTE-A but have a larger system bandwidth (e.g., 100

MHz). Or one cell may support a plurality of numerologies. That is, UEs operating with different numerologies may co-exist within one cell.

<Subframe Structure>

In the 3GPP LTE/LTE-A system, a radio frame is 10 ms (307200$T_s$) long, including 10 equal-size subframes (SFs). The 10 SFs of one radio frame may be assigned numbers. $T_s$ represents a sampling time and is expressed as $T_s$=1/(2048*15 kHz). Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

FIG. 4 illustrates an exemplary slot structure available in the new radio access technology (NR).

To minimize a data transmission delay, a slot structure in which a control channel and a data channel are multiplexed in time division multiplexing (TDM) is considered in 5$^{th}$ generation (5G) NR.

In FIG. 4, an area marked with slanted lines represents a transmission region of a DL control channel (e.g., PDCCH) carrying DCI, and a black part represents a transmission region of a UL control channel (e.g., PUCCH) carrying UCI. DCI is control information that a gNB transmits to a UE, and may include information about a cell configuration that a UE should know, DL-specific information such as DL scheduling, and UL-specific information such as a UL grant. Further, UCI is control information that a UE transmits to a gNB. The UCI may include an HARQ ACK/NACK report for DL data, a CSI report for a DL channel state, a scheduling request (SR), and so on.

In FIG. 4, symbols with symbol index 1 to symbol index 12 may be used for transmission of a physical channel (e.g., PDSCH) carrying DL data, and also for transmission of a physical channel (e.g., PUSCH) carrying UL data. According to the slot structure illustrated in FIG. 2, as DL transmission and UL transmission take place sequentially in one slot, transmission/reception of DL data and reception/transmission of a UL ACK/NACK for the DL data may be performed in the one slot. As a consequence, when an error is generated during data transmission, a time taken for a data retransmission may be reduced, thereby minimizing the delay of a final data transmission.

In this slot structure, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the legacy LTE/LTE-A system, a DL control channel is multiplexed with a data channel in TDM, and a control channel, PDCCH is transmitted distributed across a total system band. In NR, however, it is expected that the bandwidth of one system will be at least about 100 MHz, which makes it inviable to transmit a control channel across a total band. If a UE monitors the total band to receive a DL control channel, for data transmission/reception, this may increase the battery consumption of the UE and decrease efficiency. Therefore, a DL control channel may be transmitted localized or distributed in some frequency band within a system band, that is, a channel band in the present disclosure.

In the NR system, a basic transmission unit is a slot. A slot duration includes 14 symbols each having a normal cyclic prefix (CP), or 12 symbols each having an extended CP. Further, a slot is scaled in time by a function of a used subcarrier spacing. That is, as the subcarrier spacing increases, the length of a slot decreases. For example, given 14 symbols per slot, if the number of slots in a 10-ms frame is 10 for a subcarrier spacing of 15 kHz, the number of slots is 20 for a subcarrier spacing of 30 kHz, and 40 for a subcarrier spacing of 60 kHz. As the subcarrier spacing increases, the length of an OFDM symbol decreases. The number of OFDM symbols per slot is different depending on the normal CP or the extended CP, and does not change according to a subcarrier spacing. The basic time unit for LTE, $T_s$ is defined as 1/(15000*2048) seconds, in consideration of the basic 15-kHz subcarrier spacing and a maximum FFT size of 2048. $T_s$ is also a sampling time for the 15-kHz subcarrier spacing. In the NR system, many other subcarrier spacings than 15 kHz are available, and since a subcarrier spacing is inversely proportional to a corresponding time length, an actual sampling time $T_s$ corresponding to subcarrier spacings larger than 15 kHz becomes shorter than 1/(15000*2048) seconds. For example, the actual sampling time for the subcarrier spacings of 30 kHz, 60 kHz, and 120 kHz may be 1/(2*15000*2048) seconds, 1/(4*15000*2048) seconds, and 1/(8*15000*2048) seconds, respectively.

<Analog Beamforming>

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Figure 5:
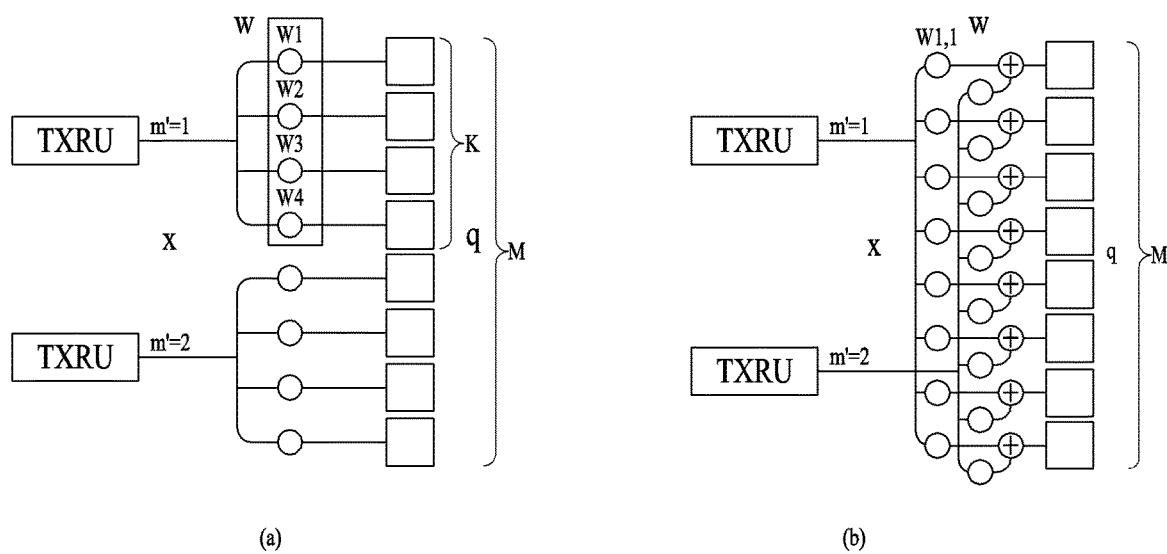
FIG. 5 is a view illustrating exemplary connection schemes between transceiver units (TXRUs) and antenna elements.

FIG. 5 is a view illustrating exemplary connection schemes between TXRUs and antenna elements.

(a) of FIG. 5 illustrates connection between a TXRU and a sub-array. In this case, an antenna element is connected only to one TXRU. In contrast, (b) of FIG. 5 illustrates connection between a TXRU and all antenna elements. In this case, an antenna element is connected to all TXRUs. In FIG. 5, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present invention is proposed by reflecting limitations caused by the nature of analog BF or hybrid BF.

<Hybrid Analog Beamforming>

Figure 6:
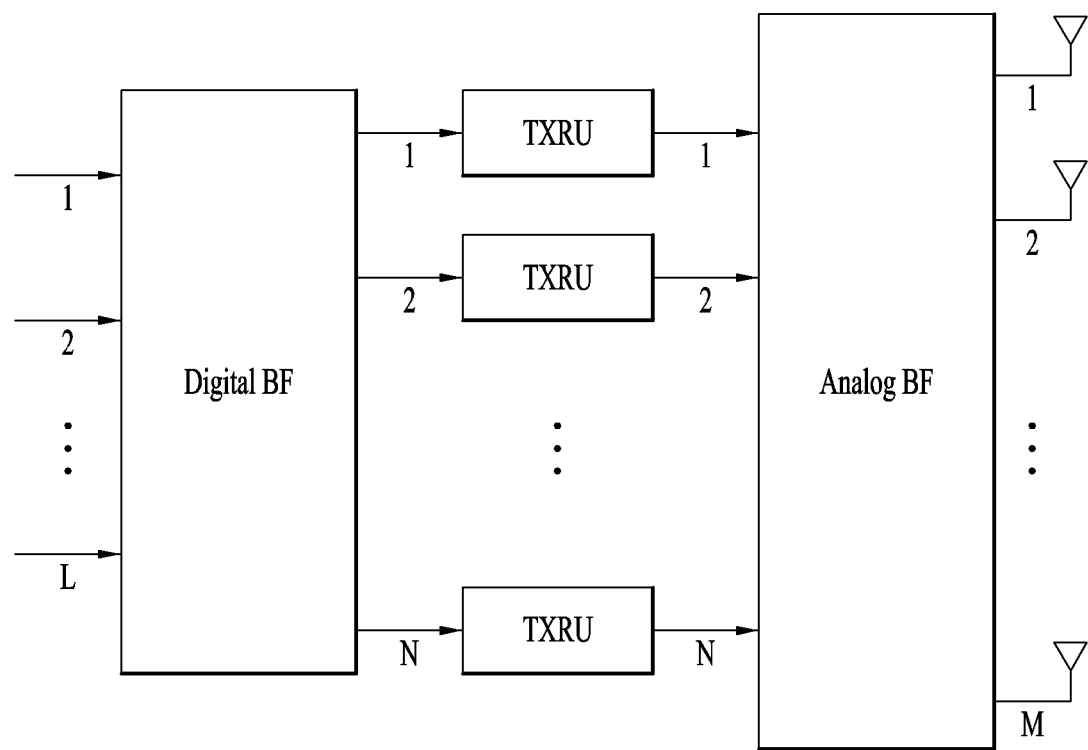
FIG. 6 is a view abstractly illustrating a hybrid beamforming structure in terms of TXRUs and physical antennas.

FIG. 6 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 6, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 7:
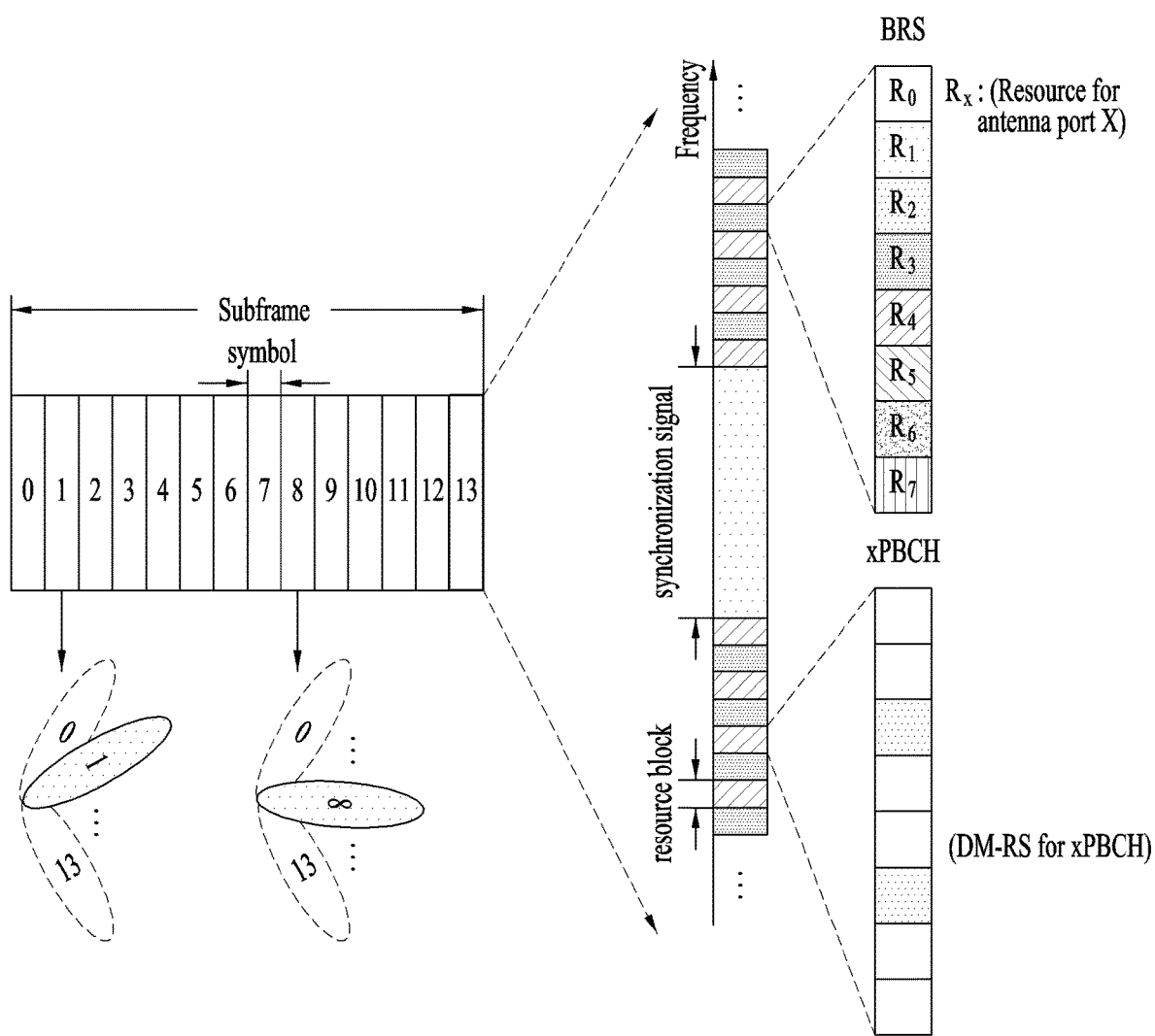
FIG. 7 is a view illustrating beam sweeping for a synchronization signal and system information during downlink (DL) transmission.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 7 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 8:
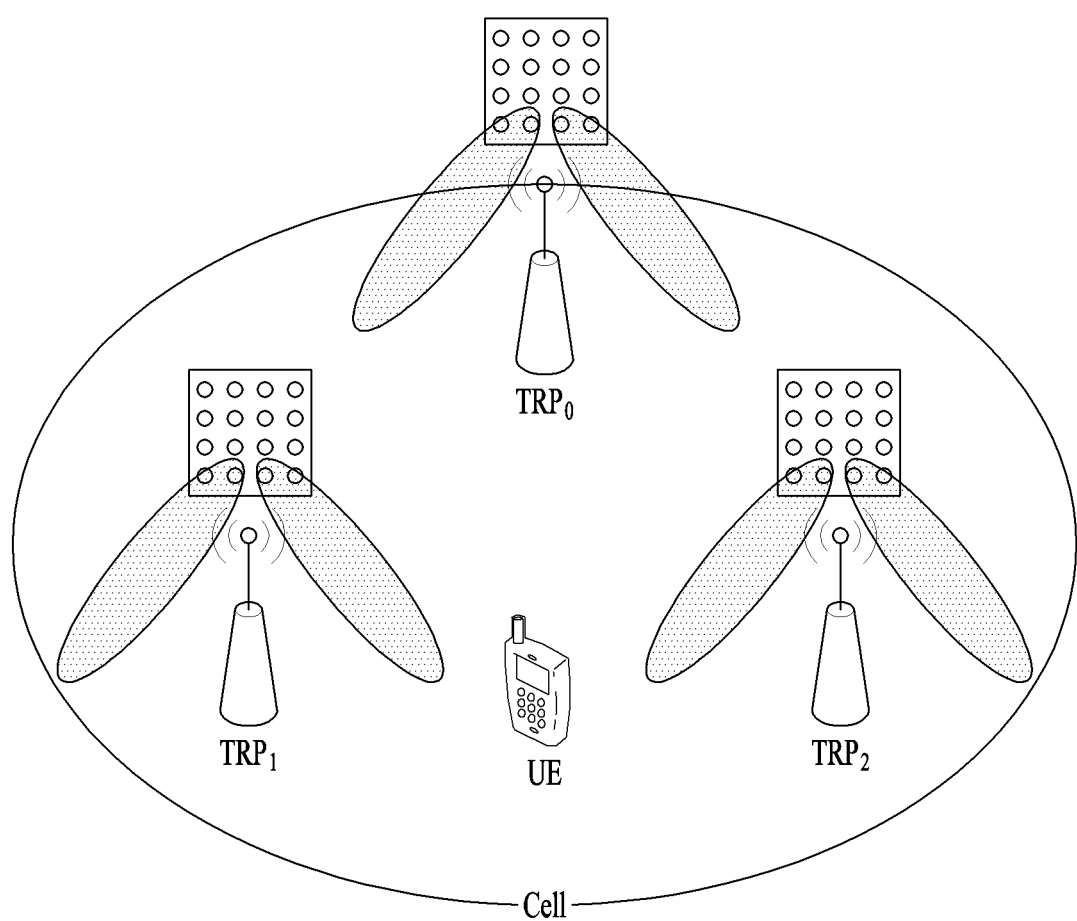
FIG. 8 is a view illustrating an exemplary cell in an NR system.

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Hereinafter, a method for transmitting and receiving a reference signal, particularly, a CSI-RS according to the present disclosure will be described.

<Downlink Reference Signal for RRM Measurement>

A fixed value is used as a power offset of an SSS with respect to a PBCH DM-RS. Here, to determine the fixed value, it is necessary to determine how resource elements (REs) that are not used for an SS and a PBCH including a PSS/SSS will be used in symbols to which SSBs are mapped.

That is, if null REs of SSBs are not used for other channels, it is desirable to use power for the REs to increase Tx power of the SS. Here, the power offset of the SSS with respect to the PBCH DM-RS may be determined as 3.5 dB if any other methods such as PBCH DM-RS power boosting are not considered. However, the null REs of the SSBs are regarded as resources for other channels and power boosting for the SS is an issue with respect to implementation, and thus it is desirable to determine the power offset value of the SSS with respect to the PBCH DM-RS as 0 dB.

Here, the number of null REs in the SSBs is 288, which are sufficient for use as resources for REs for a PDSCH and various channels such as a paging indicator. Accordingly, null REs may be used for transmission of a specific channel and the power offset of the SSS with respect to the PBCH DM-RS may be fixed to 0 dB. In this case, power increase of the SS for coverage improvement may remain an issue in implementation of a gNodeB.

<Definition of RSRP and RSRQ>

1. Definition of RSRP

RSRP is measured on the basis of a CRS in LTE, whereas RSRP is measured using the SS and the PBCH DM-RS in the NR system. Definition of RSRP is shown in Table 1.

TABLE 1

| Definition | Reference signal received power (RSRP), is defined as the linear average over the power contributions (in [W]) of the resource elements that carry secondary synchronization signals within the considered measurement frequency bandwidth. For RSRP determination, the secondary synchronization signals according to 3GPP TS 38.211 [4] shall be used. UE may use demodulation reference signals for physical broadcast channel in addition to secondary synchronization signal to determine RSRP. RSRP per cell shall be derived by the UE by linear averaging over best N RSRP above absolute configured threshold. [The reference point for the RSRP shall be the antenna connector of the UE |
|---|---|

TABLE 1-continued

[If receiver diversity is in use by the UE, the reported value shall not be lower than the corresponding RSRP of any of the individual diversity branches.]

The contents of Table 1 are described in detail hereinafter.

(1) RSRP of SSS or PBCH DM-RS

SS/PBCH RSRP may be measured through the SSS and PBCH DM-RS and a signal actually used to measure the SS/PBCH RSRP is an issue of implementation. However, it is necessary to define at least whether a reported value is measured on the basis of the SSS or the PBCH DM-RS. Since the PBCH DM-RS is considered as an assistance signal of the SSS, actual SSS RSRP is used as SS/PBCH RSRP and PBCH DM-RS RSRP needs to be compensated with a power offset value for obtaining SS/PBCH RSRP.

(2) Whether RSRP is Measured at Beam Level or Cell Level

In the NR system, RSRP is measured at a beam level first and cell-level RSRP is calculated on the basis of beam-level RSRP and reported. That is, cell quality may be obtained by selecting up to N−1 best beams having quality equal to or higher than a threshold value set as an absolute value and calculating the average of N−1 or fewer best beams. Accordingly, it is sufficient to define only RSRP measurement with respect to the beam level in a physical layer.

(3) Antenna Connector

In the NR system, a diversity branch, that is, a receiver antenna port, may be composed of a plurality of antenna elements for analog beamforming and a measurement point according thereto needs to be accurately designated. Further, when a maximum coupling loss (MCL) or channel quality of a UE is discussed, an antenna gain may include a beamforming gain. Accordingly, a diversity branch, that is, an antenna connector for a measurement point, needs to be defined as a position after completion of analog beamforming.

2. Definition of RSSI and RSRP

Although RSRQ is simply defined as RSRP/RSSI in a linear domain, only the RSSI is defined in the present invention. If no configuration is used, the RSSI may be measured only through all REs included in an SS block for RSRP measurement. However, when beams are coordinated or scheduling between cells or TRPs is adjusted in a multi-beam scenario, REs for RSSI measurement may be designated by a network and a UE needs to measure RSSI using OFDM symbols configured by a gNodeB. Here, REs for RSSI measurement may be beam-specific or beam-common.

<Configuration for SSB-Based Measurement>

1. Configuration for SSB-Based Measurement

Parameters which can be basically configured for SSB-based measurement include a measurement duration, a period and a slot offset from a frame boundary. Thereamong, the number of measurement periods may be set to a maximum of 2 for intra-frequency measurement or set to a maximum of 1 for idle mode or inter-frequency measurement. A measurement period and an offset from a frame boundary need to be set such that all SSBs of cells included in a cell list or a target cell are transmitted within a configured measurement window. If there are multiple measurement periods, measurement opportunity between configured windows may be configured per cell.

2. Actual Transmitted SSB

Information about actual transmitted SSBs needs to be configured in consideration of UE complexity in addition to parameters which can be basically set. In addition, information about actual transmitted SSBs of a neighbor cell may be information about subset measurement of candidate SSBs.

In the case of an idle mode, information about actual transmitted SSBs of a neighboring cell is transmitted to UEs as a configuration parameter of SSB-based measurement. Further, when configuration per cell is not considerable from the viewpoint of signaling overhead, the information about actual transmitted SSBs may be configured along with a default value per frequency for cells which are not included in the cell list, and information about actual transmitted SSBs of the serving cell may be additionally configured for optimization of serving cell operation. In the case of a connected mode, information configured in the idle mode may be used as a default value and additional information may be configured along with a measurement period per cell for both the serving cell and neighbor cells.

For the serving cell, the information about actually transmitted SSBs needs to be configured as full bitmap information for correct rate matching of a PDSCH as well as optimization of measurement operation. For example, if the number of SSBs that can be transmitted is 64, the information needs to be configured as 64-bit bitmap information.

On the other hand, configuration per cell with respect to neighbor cells requires a large amount of signaling messages and thus needs to be transmitted in a compressed form in order to minimize signaling overhead. Further, a basic configuration for actual transmitted SSBs is required for cells which are not included in the cell list in addition to configurations per cell.

<CSI-RS Resource and Measurement Configuration>

Design of a CSI-RS for RRM measurement is the same as a CSI-RS for beam management. That is, basic resource configuration for RRM measurement, such as port number, resource density, number of OFDM symbols per CSI-RS, and whether a CSI-RS is configurable, may be determined according to the CSI-RS for beam management. Meanwhile, RRM measurement related parameters other than the aforementioned CSI-RS resource configuration will be described later.

1. Periodicity

A basic characteristic for L3 mobility is determining CSI-RS periodicity, that is, whether a CSI-RS is transmitted periodically or aperiodically. When the CSI-RS is triggered in an aperiodic manner, downlink control overhead occurs. In addition, it is not easy to dynamically trigger CSI-RS transmission of a neighbor cell for L3 mobility. Accordingly, the CSI-RS for L3 mobility needs to be periodically transmitted in consideration of UE operation of L3 mobility.

In a discussion about SSB periodicity for mobility, an SSB period is set to {5 ms, 10 ms, 20 ms, 40 ms, 80 ms, 160 ms}. In addition, the CSI-RS is used as a complementary RS for SSBs in order to support stabilized mobility when SSBs have a more segmented beam level while having longer periodicity. Accordingly, a CSI-RS transmission period may need not be longer than an SSB transmission period and thus {5 ms, 10 ms, 20 ms, 40 ms} may be used as CSI-RS periods for RRM measurement. In addition, a measurement period may be configured per resource according to CSI-RS resource configuration of a UE dedicated signaling message for at least intra-frequency measurement.

2. Configuration of Different Bandwidths and Center Frequencies for Cells

In the NR system, an eNB supports frequency bands of a wideband with one component carrier (CC) in order to improve frequency efficiency. In this case, the eNB supports wideband frequencies, but UEs may have different radio frequencies (RFs) or processing capabilities and different frequency bands may be required according to services and thus the eNB needs to be able to simultaneously support UEs operating in different frequency bands at a wideband frequency. Here, a frequency band configured to support services per UE may be referred to as a bandwidth part (BWP) and the BWP may be configured by parameters different for respective UEs.

In addition, when a plurality of narrow band UEs is supported in a wideband, BWPs may be configured at different frequency positions for UEs in order to disperse data loads or support different subcarrier spacings (SCSs). Here, frequency bands which are not used may be present in the entire wideband, and an eNB may not transmit signals through the unused frequency bands in order to increase power efficiency and to reduce the amount of interference with respect to neighbor cells.

Figure 9:
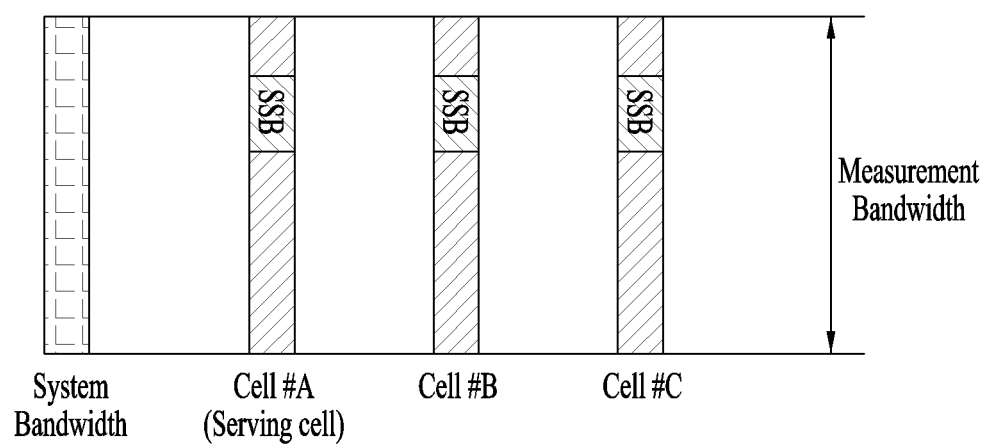
FIGS. 9 to 11 are views illustrating embodiments of setting a measurement bandwidth.
Figure 10:
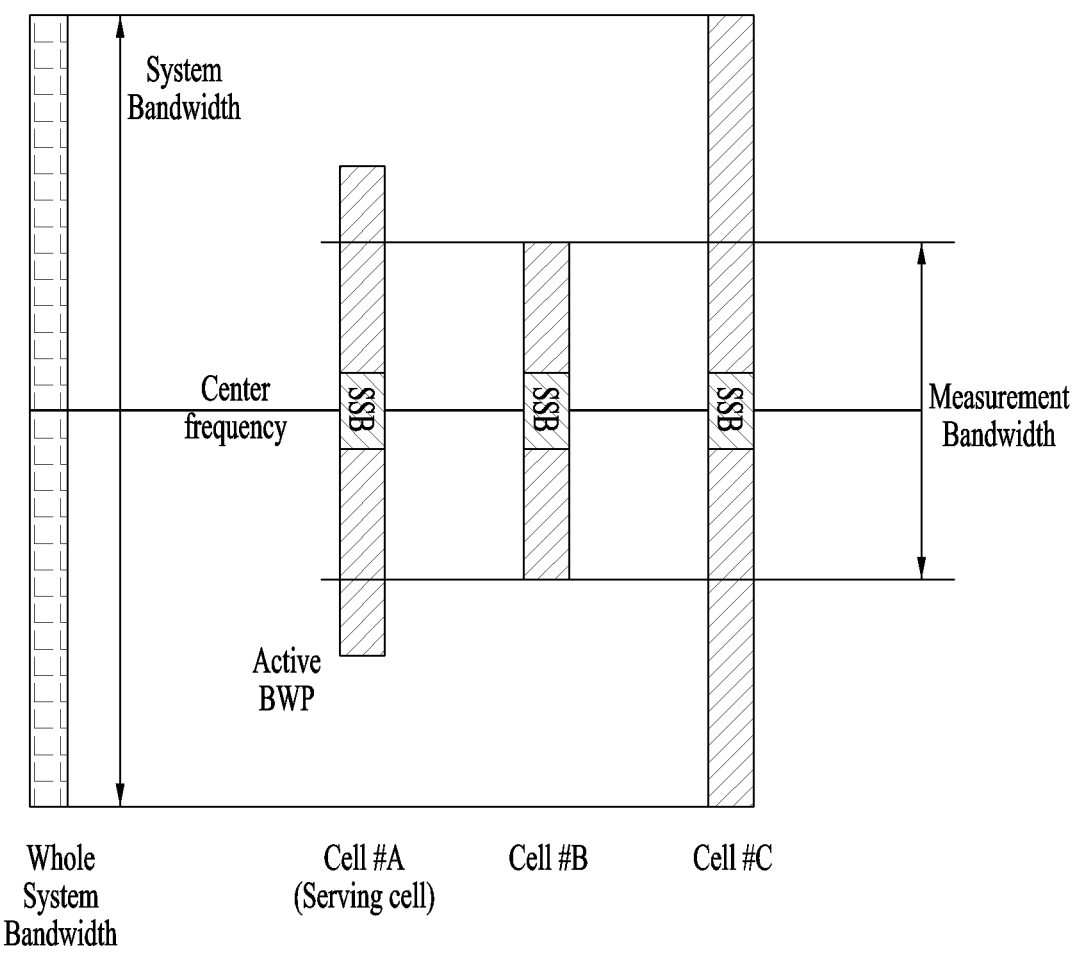
Figure 11:
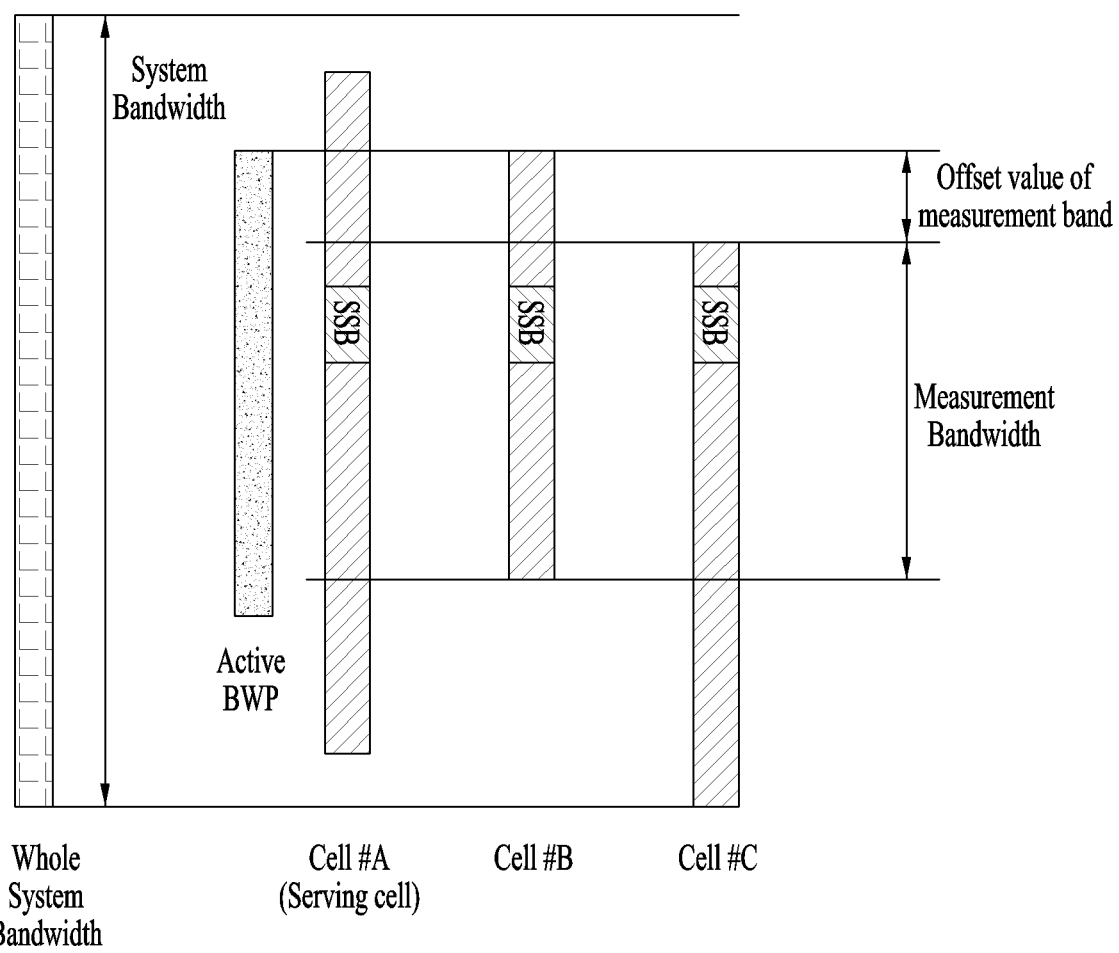

Furthermore, an eNB may configure different bandwidths for cells for optimization of costs because a data load may be different in regions. When the above-described configuration is applied to each eNB, different bandwidths and center frequencies may be configured for cells, as shown in FIGS. 9 to 11.

3. Measurement Bandwidth

In LTE, a CRS is used for RRM measurement and a system bandwidth of a neighbor cell may differ from that of a serving cell, and a measurement bandwidth for RRM measurement of the CRS is configured. In addition, even though a UE satisfies minimum performance requirements, the UE may sufficiently use the CRS for the configured measurement bandwidth in order to minimize UE complexity.

Meanwhile, in the NR system, a CSI-RS measurement bandwidth to be applied to all neighbor cells may be configured through a UE dedicated RRC configuration message using the same strategy as in LTE and may be commonly applied to all CSI-RS resources. From the viewpoint of UEs, CSI-RS measurement bandwidth information configured through the UE dedicated RRC configuration message refers to a maximum measurement bandwidth permitted for CSI-RS measurement, and an actual amount of part of the CSI-RS bandwidth used for measurement by UEs is an issue of implementation. For example, a maximum measurement bandwidth permitted for CSI-RS measurement may be configured in the range of 5 to 100 MHz at below 6 GHz and in the range of 50 to 400 MHz at above 6 GHz.

Further, a frequency position of a measurement band needs to be defined in addition to the measurement bandwidth. In addition, definition of intra-frequency and inter-frequency measurement for the frequency position of the measurement band is as follows.

1) Intra-frequency measurement: A UE may be configured to perform intra-frequency measurement for SSBs and/or CSI-RS resources. SSB-based intra-frequency measurement and CSI-RS-based intra-frequency measurement are defined as follows.

In SSB-based measurement performed by the UE for a neighbor cell, a center frequency of an SSB used for measurement of a serving cell is identical to a center frequency of an SSB used for measurement of the neighbor cell.

CSI-RS-based measurement performed by the UE in the neighbor cell is called intra-frequency measurement provided by a center frequency of a CSI-RS resource configured for measurement of the serving cell. Here, the center frequency of the CSI-RS resource configured for measurement of the serving cell is identical to a center frequency of a CSI-RS configured for measurement in the neighbor cell.

2) Inter-frequency measurement: A UE may be configured to perform inter-frequency measurement for SSBs and/or CSI-RS resources. SSB-based inter-frequency measurement and CSI-RS-based inter-frequency measurement are defined as follows.

In SSB-based measurement performed by the UE in a neighbor cell, a center frequency of an SSB used for measurement of a serving cell is different from a center frequency of an SSB used for measurement of the neighbor cell.

CSI-RS-based measurement performed by the UE in the neighbor cell is called intra-frequency measurement provided by a center frequency of a CSI-RS resource configured for measurement of the serving cell. Here, the center frequency of the CSI-RS resource configured for measurement of the serving cell is different from a center frequency of a CSI-RS configured for measurement in the neighbor cell.

3) A scenario for a plurality of SSBs in a serving cell: When a serving cell of a UE transmits a plurality of SS blocks, the UE needs to configure a reference SSB in the serving cell in order to perform SSB-based intra-frequency measurement.

If a measurement band is located outside an active BWP, this corresponds to inter-frequency measurement. Accordingly, CSI-RS-based measurement is only considered when the measurement band is located within the active BWP. Hence, when a measurement bandwidth is less than the active BWP, the frequency position of the measurement band is signaled to the UE. Here, information on the frequency position of the measurement band is signaled to the UE as a starting RB position within the active BWP. However, if the measurement bandwidth is identical to the active BWP, starting RB positions thereof are identical and thus the frequency position information of the measurement band may be omitted.

The aforementioned CSI-RS measurement bandwidth configuration is described in more detail hereinafter.

In a mobile communication system, signal qualities of neighbor cells as well as a serving cell are measured and reported to an eNB in order to support mobility. Then, the eNB determines a serving cell on the basis of the signal qualities and signals the serving cell to UEs. To this end, a UE may measure signal quality using a signal transmitted in a system bandwidth defined by the system, in general, as shown in FIG. 9.

In systems such as LTE and NR, however, a plurality of bandwidths is defined in the standards and different frequency bands may be configured for cells within a frequency band operated by one operator. Accordingly, if the center frequencies of system bands for all cells are identical although different bandwidths are configured for cells within a system bandwidth operated by an operator, an eNB needs to signal, to UE, information about a measurement bandwidth in which signal qualities of all cells in which the eNB is interested can be measured, as shown in FIG. 10. Here, the center frequency of the measurement bandwidth may be configured to be identical to the center frequency of the system bandwidth, as shown in FIG. 10.

Additionally, when different bandwidths are configured for cells within the system bandwidth operated by the operator and center frequencies for the cells also different within the system bandwidth, that is, when a measurement bandwidth is less than the active BWP, the eNB may signal, to UEs, information about the position of the measurement bandwidth in the active BWP along with information about the measurement bandwidth, as shown in FIG. 11. More specifically, referring to FIG. 11, the position of the measurement bandwidth may be signaled using a relative position of the starting frequency or the starting RB of the measurement BWP with respect to the starting frequency or the starting RB of the active BWP, that is, an offset value. However, when a measurement band includes the entire active BWP, the size of the active BWP is identical to the size of the measurement bandwidth and thus transmission of information about the active BWP may be omitted. That is, if the information about the active BWP is not additionally configured, a UE may perform measurement of a mobility RS on the assumption that the active BWP is configured as a measurement bandwidth.

4. Numerology of CSI-RS

Although a subcarrier spacing of the CSI-RS is based on a subcarrier spacing of a data channel for facilitation of resource allocation, in general, a subcarrier spacing of a data channel of a neighbor cell may not be identical to the subcarrier spacing of a data channel of a serving cell. Accordingly, the subcarrier spacing of the CSI-RS may be semi-statically configured per cell or frequency through an RRC configuration message. However, configuration of the subcarrier spacing of the CSI-RS per frequency may be preferable in terms of UE complexity. In addition, measurement with respect to cells having different subcarrier spacings corresponds to inter-frequency measurement, as described above. Accordingly, the subcarrier spacing of the CSI-RS may be configured per frequency or measurement object.

That is, a symbol duration of the CSI-RS is based on a subcarrier spacing of a data channel and is configured per frequency through an RRC signaling message. Here, a subcarrier spacing of a data channel may be {15, 30, 60 kHz} at below 6 GHz and may be {60, 120 kHz} at above 6 GHz.

5. Resource Configuration and RE Mapping

In intra-frequency measurement, information about CSI-RS resources may be configured per resource for efficient use of resources and needs to be configured as time and frequency resource information. Information about time resources may be provided as information about absolute symbol positions on the basis of SFN, frame and slot boundary information about each target cell determined by SSB timing information. In addition, information about frequency resources is configured as a starting RB position in a BWP, and as an RE density and an RE position in an RB. Here, cases in which a starting RB position in a BWP is set may be limited to cases in which a measurement bandwidth is less than the bandwidth of an active BWP and cases in which RE density is configured may be limited to cases in which RE density is not fixed in standard documents.

Furthermore, time information about CSI-RS resources may be based on SFN, frame and slot boundary information, as described above. Here, the time information may be acquired by decoding a PBCH transmitted in a frequency band of 6 GHz or higher.

However, in the case of inter-frequency measurement, HARQ cannot be completely combined due to measurement gap configuration and thus PBCH decoding performance cannot be guaranteed. Accordingly, a UE cannot determine symbol positions with respect to CSI-RS resources irrespective CSI-RS resource configuration unless CSI-RS resources are limited within symbols with respect to QCLed SSBs. Therefore, CSI-RS-based RRM measurement may be permitted only when time resources for the CSI-RS are configured in symbols of QCLed SSBs in inter-frequency measurement and CSI-RS-based RRM measurement is not configured at above 6 GHz if not.

6. Contents of QCL Information and Measurement Report

The CSI-RS does not have a self-synchronization property and requires a physical cell ID to obtain temporal positions of CSI-RS resources. In addition, the SSB may aid in mitigating UE complexity for RRM measurement and thus it is desirable that spatial QCL information about the SSB be provided as a configuration parameter. That is, SSB and CSI-RS resources are spatially QCLed for timing synchronization in QCL information and the QCL information needs to include information about a PCID. Such QCL information needs to be configured per resource.

The contents of a measurement report may depend on whether the CSI-RS is associated with the SSB. For example, if the CSI-RS is associated with the SSB when a CSI-RS RSRP based measurement event is triggered, SSB RSRP may be reported along with CSI-RS RSRP. However, if the CSI-RS is not associated with the SSB, a UE need not report the SSB when reporting CSI-RS RSRP. Further, when CSI-RS resources are not configured for a specific cell, only SSB RSRP may be reported to the specific cell.

7. Parameters of Mobility Reference Signal Sequence and Scrambling Sequence

In general, a CSI-RS scrambling sequence may be initialized by a virtual cell ID, and the virtual cell ID may be allocated to CSI-RS resources according to cell arrangement based on beam or TRP information that may be included in the virtual cell ID by a gNodeB. Based on the above description, a scrambling ID of 10 bits or more may be used for initialization of the CSI-RS scrambling sequence and the scrambling ID may be configured per resource through an RRC message. In addition, slot information may be regarded as sequence initialization information for interference randomization.

Meanwhile, to support UE mobility in a mobile communication system, an eNB may transmit an RS for supporting mobility. For example, the CRS may be used as a mobility RS in LTE and the CSI-RS may be used as a mobility RS in the NR system. Here, the eNB may configure a mobility RS using a sequence which can be identified per cell or per beam in a cell and transmit the mobility RS because signal quality is measured per cell or per beam in a cell. For reference, "per cell" will be used to represent "per cell or per beam in a cell" in the following description.

In other words, although a UE requires only information about sequences of a serving cell in normal data communication, the UE requires information about sequences of all cells when a mobility RS is used because signal quality is measured using mobility RSs of all cells that the UE intends to measure. Accordingly, it is possible to configure sequence information about a mobility RS defined per cell and signal the sequence information of the mobility RS per cell to the UE by previously configuring the sequence information about the mobility RS defined per cell or through additional signaling. Then the UE may generate a sequence of the mobility RS per cell.

For generation of a mobile RS sequence as described above, a communication system may define a pseudo-random sequence generator and configure different initial values or function input values of the sequence generator for cells, in general. Here, to signal information related to the mobility RS sequence to the UE, an eNB previously configures information related to an input parameter of a sequence generation function per cell and informs the UE of the information through signaling. In the LTE or NR system, a gold sequence is generally defined by the sequence generator and, when initial values of the sequence generator are changed, sequences generated using different sequence initial values are delayed with respect to one sequence due to characteristics of the gold sequence. That is, when sequences are generated using the gold sequence, sequences are generated by being cyclically shifted by a specific value with respect to one sequence.

Accordingly, the present disclosure proposes a method for solving programs caused by such gold sequence property.

That is, a description will be given of a method of generating a sequence and mapping the generated sequence to a frequency band in the cases of FIGS. 9 to 11 when a mobility RS sequence is generated on the basis of the gold sequence according to the above-described method.

1) Case of FIG. 9: If different input values of a sequence generation function are provided, sequences generated for respective cells unconditionally have different values because all cells are located in the same frequency band. Accordingly, a cell ID is included in the input value of the sequence generation function per cell.

Figure 12:
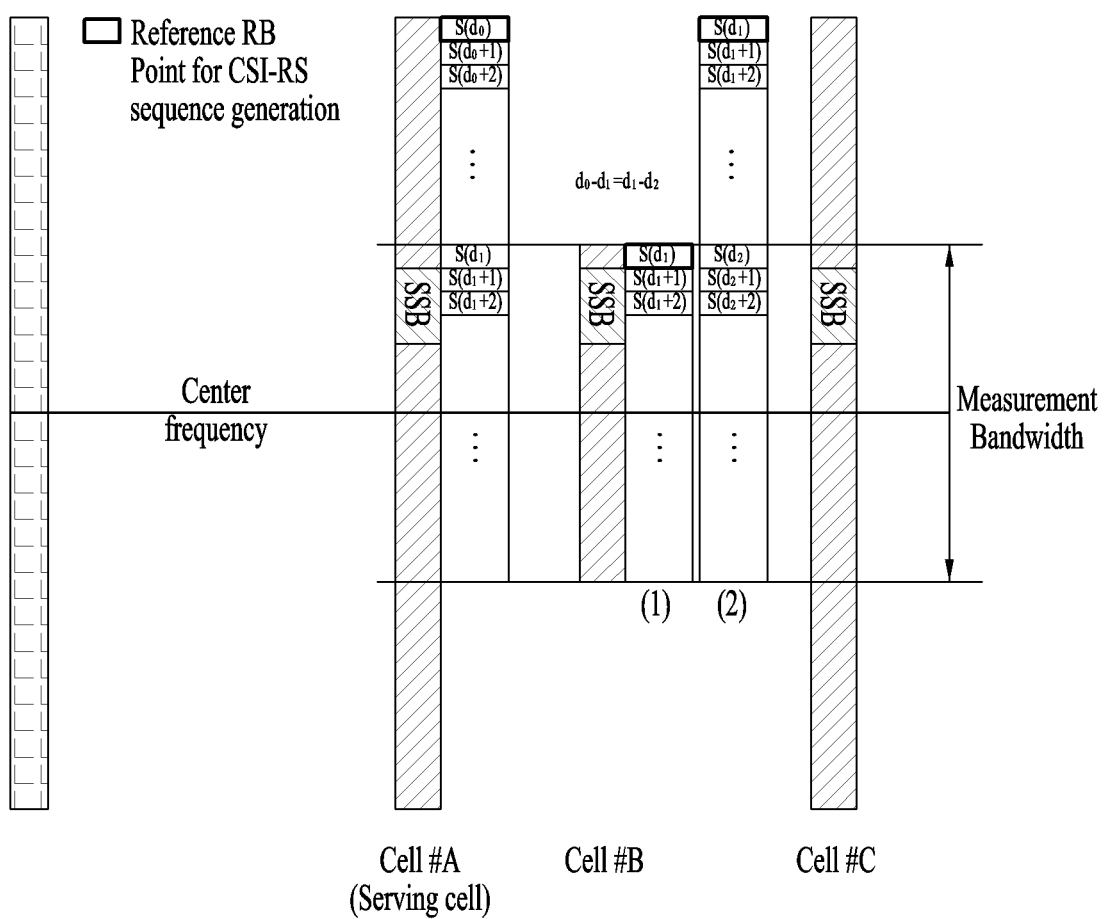
FIGS. 12 to 14 are views illustrating embodiments of mapping CSI-RS sequences.

2) Case of FIG. 10: If operation is performed in the same manner as that of FIG. 9 and generated sequences are mapped to REs/RBs included in frequency bands corresponding to the respective cells in FIG. 10, collision may occur between sequences. That is, different input values of a sequence generator are provided and thus cells generate different sequences in a delayed manner as shown in FIG. 12. However, sequences may be mapped in a delayed manner in a sequence mapping procedure, as shown in (1) of FIG. 12, and thus collision may occur between sequences.

To prevent this, a reference bandwidth is determined among a plurality of system bandwidths, as shown in (2) of FIG. 12, and the reference bandwidth may be defined as resources for starting sequence mapping when sequences are mapped to resources.

According to the above-described method, if a sequence generation rule is determined and only information about a measurement bandwidth for a measurement band is acquired, additional information about sequences is not required because the center frequency of the measurement band is identical to the center frequency of a system band. LTE is a typical system to which this embodiment is applied.

That is, cell A and cell B define a common reference bandwidth for sequence mapping and use the first RB of the reference bandwidth as a mapping reference point of the first sequence bit of all cells.

3) Case of FIG. 11: Distinguished from the case of FIG. 10, cells may have different center frequencies as well as bandwidths in the case of FIG. 11. In this case, even if a reference bandwidth is designated as shown in FIG. 12, a reference point such as a common reference RE/reference RB cannot be defined because cells have different center frequencies and thus a sequence collision problem cannot be solved.

Accordingly, it is necessary to additionally configure a virtual reference position that can be shared by all cells for sequence generation and mapping, and the virtual reference position may be defined in advance by standards or may be determined by a network including an eNB.

Here, the virtual reference position may be a virtual reference RE position or a virtual reference RB position. The virtual reference position is called a virtual position because an RB position that is not actually used outside a system band operated by each cell or the current network is determined as a reference point.

When the virtual reference position is defined in advance by the standards, a virtual reference RB position determined in the corresponding frequency band by applying the center frequency of the network on the basis of the maximum number of RBs defined in the standards may be defined as a reference position for sequence generation and mapping, as mentioned in the case of FIG. 10. Here, the virtual reference RB position may be arbitrarily configured by an eNB in an implementation stage with the number of bits for CSI-RS transmission as a limit.

In addition, it is advantageous to configure the virtual reference RB position outside the first RB position of a cell having the widest frequency band in the system band to conserve the number of bits or generation of sequences.

Here, distinguished from the case of FIG. 10, cells have different center frequencies as well as different bandwidths in the case of FIG. 11, and thus it is necessary to signal how distant a frequency band defined as a measurement band or a frequency band of an active BWP is from a configured virtual reference RB position. To this end, there is a method of signaling all of information about the virtual reference RB position, that is, the system bandwidth and center carrier frequency of a serving cell, and information about a transmission bandwidth per CSI-RS resource and the center frequency of the transmission bandwidth along with a reference RB (position information of the reference RB) from the system band as the simplest method.

However, if information about the aforementioned virtual reference RB position is used only for CSI-RS sequence generation and mapping, the information about the virtual reference RB position may serve as excessive overhead.

Accordingly, an eNB may signal, to a UE, only a difference between frequency positions of the virtual reference RB position or virtual reference RE position and a measurement band to be used for actual measurement as a sequence offset instead of directly signaling the information about the virtual reference position.

Figure 13:
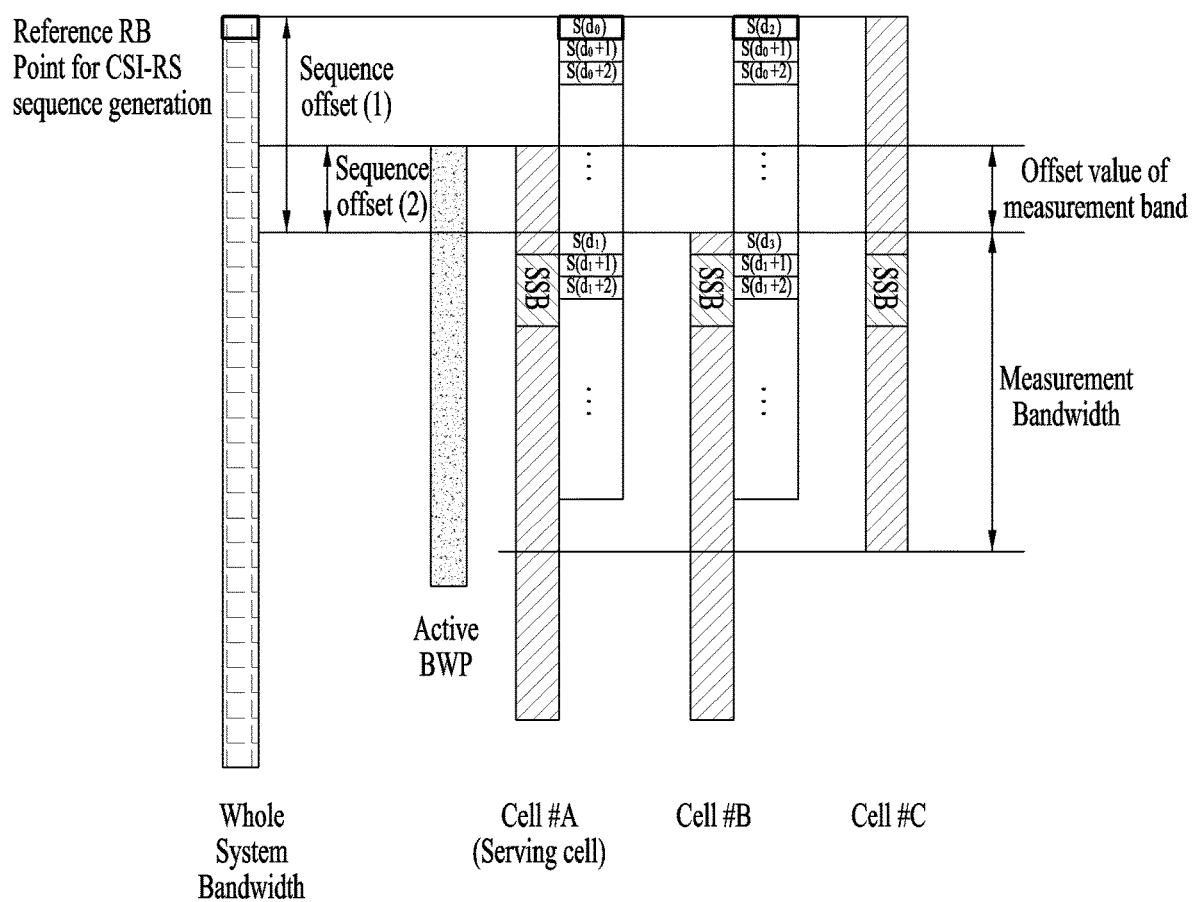

The case of FIG. 11 is described in detail with reference to FIG. 13. Referring to FIG. 13, it is assumed that the first RB position in a system band operated by a network is a virtual reference RB point. Then, a sequence offset with respect to a difference between a reference point of a measurement band commonly used for all cells and the virtual reference RB point, that is, "sequence offset (1)" is signaled. Here, the reference point of the measurement band may be the first RB or the center frequency of the measurement band.

If a UE knows frequency position information about a measurement band for an active BWP, a difference between a reference point of the active BWP and the virtual reference RB point, that is, "sequence offset (2)" may be signaled as a sequence offset. Here, the reference point of the active BWP may be the first RB or center frequency of the active BWP.

Meanwhile, the sequence offset is commonly applied to CSI-RS resources configured for neighbor cell measurement.

Here, the unit for the sequence offset may be determined as 1) sequence bit offset (number of bits), 2) the number of RBs or RB groups, 3) sequence bit offset (number of bits)/arbitrary constant, or the like. Here, the arbitrary constant in 2) may be a fixed value or may be determined by various RRC configuration parameters such as the bandwidth of an active BWP and RB density of CSI-RS resources.

When a UE receives an input value of a sequence generator for the CSI-RS and sequence offset information from an eNB, the UE may generate sequences using the input value of the sequence generator, derive only some of the generated sequences which will be used thereby and use the derived sequences.

For example, when sequences for cell B are generated in FIG. 13, sequences S(d1), S(d1+1) . . . are generated and the UE measures the CSI-RS using only sequences S(d2), S(d2+1) . . . corresponding to a measurement band among the generated sequences.

Alternatively, the UE may modify the input value of the sequence generator using the sequence offset information such that the input value of the sequence generator is delayed by an offset and directly generate sequences to be used for measurement. For example, when sequences for cell B are generated in FIG. 13, the user may directly generate S(d2), S(d2+1), . . . by modifying the input value of the sequence generator.

Additionally, sequences to be used for measurement may be directly generated by generating a mask capable of generating a delay of a sequence in the sequence generator and using a corresponding masking value as an additional input parameter of the sequence generator. For example, when sequences for cell B are generated, sequences S(d2), S(d2+1), . . . may be directly generated using a masking value capable of providing a sequence offset as an additional input parameter in addition to the input value of the sequence generator.

The above description is described again. In a broadband component carrier (CC) scenario, the CSI-RS shared by UEs may be allocated over the entire bandwidth. Here, narrowband UEs may perform neighbor cell measurement using only some of CSI-RS sequences. Accordingly, it is necessary to signal additional information about some of CSI-RS sequences to be used for neighbor cell measurement as well as initialization information of a sequence generator corresponding to information for sequence-to-RE mapping. To this end, a reference position for sequence-to-RE mapping, that is, an RB position to which the first bit generated by the sequence generator is mapped, i.e., a reference RB position, needs to be defined.

For example, assuming that a CSI-RS sequence generator is initialized with cell ID related information for sequence identification, if CSI-RS sequences generated for cells having different bandwidths and center frequencies are mapped to RBs within system bandwidths of the cells, two sequences between cells may collide.

Figure 14:
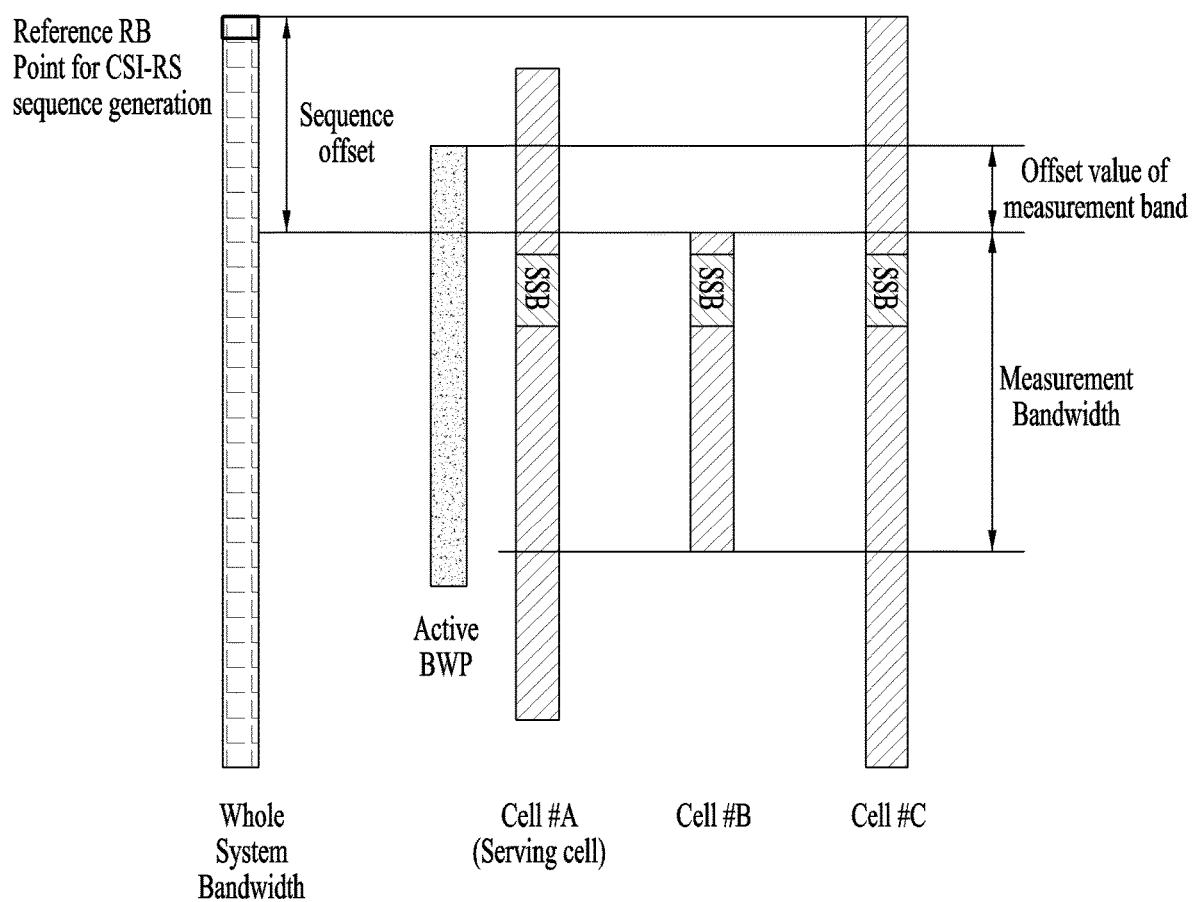

Accordingly, to avoid sequence collision, a common reference point for CSI-RS sequence-to-RE mapping between cells needs to be defined, as shown in FIG. 14. Referring to FIG. 14, cells have different system bandwidths and different center frequencies and a reference RB point is configured to the first RB position within the whole system bandwidth of an operator.

Specifically, the following two options may be considered in order to determine a reference RB point.

Option 1) The reference RB point is configured to the first RE position of a reference signal within the whole system bandwidth.

Option 2) The reference RB point is configured to a virtual RE position.

Here, option 2 is a method similar to LTE. Here, a reference point is the first RE of an RS which assumes the maximum number of RBs in RB allocation.

When the center frequency of the system is aligned with a frequency at which a UE operates during an initial access procedure and a band agnostic operation which is the same as a measurement operation using the CRS in LTE is required, option 2 is preferable to configure a reference RB point.

However, option 2 is not desirable in the NR system because center frequency alignment may not be supported. Accordingly, it is desirable to use the first RE position of a reference signal as a reference RB point for sequence-to-RE mapping in the whole system bandwidth as in option 1.

Here, a reference RB is not an actual RB used for transmission performed by cell A which is a serving cell of a target UE and is a virtual RB for sequence-to-RE mapping. In other words, a reference point for sequence generation may be commonly configured to the (virtual) first RB in the whole system bandwidth operated by the network for all neighbor cells irrespective of the bandwidth of each neighbor cell.

Meanwhile, information about a measurement bandwidth or the position of an active BWP in the whole system bandwidth needs to be signaled to a UE, and the UE determines a part of CSI-RS sequences used for RSRP measurement on the basis of the signaled information. In addition, information about measurement band configuration may include the center frequency of the system band of a serving cell, a system bandwidth, the frequency position of a configured BWP, and the frequency position of a measurement band in the configured BWP, and the UE may generate CSI-RS sequences using the information about measurement band configuration. However, when the information about measurement band configuration is used only for CSI-RS sequence generation, the amount of redundantly signaled information increases. That is, there is a disadvantage in terms of signaling overhead.

Accordingly, it is possible to signal only a relative distance between the starting RB position of a configured BWP or a measurement band located within the configured BWP and a reference RB position for CSI-RS sequences, that is, an offset between the starting RB position and the reference RB position. In addition, considering that the NR system can support various numerologies, the aforementioned RB offset value may be interpreted on the basis of a specific numerology. Accordingly, it is desirable that a starting RB offset be represented as a sequence offset for sequence generation as shown in FIG. 14.

Candidate values for configuration parameters for CSI-RS-based measurement and signaling methods may be as shown in Table 2.

TABLE 2

| Parameters | Signaling method | Candidate values |
| --- | --- | --- |
| Periodicity | Per frequency | {5 ms, 10 ms, 20 ms, 40 ms} |
| Measurement bandwidth | Per frequency | {5~100 MHz} for B6G/{50~400 MHz} for A6G |
| Sub-carrier spacing | Per frequency | {15, 30, 60 kHz} for B6G/{60, 120 kHz} for A6G |
| Time/Freq. resources | Per resources | Symbol position Starting RB position, RE density, RE position |
| QCL information | Per resource/resource group | Time reference: PCID {0~1007} Spatially QCL: SSB ID {0~63} |
| Sequence | Per resource | Initialization information: Over 10 bits RE mapping: Sequence offset |

<CSI-RS-based Measurement for Cells which are not Included in Cell List>

When a network configures CSI-RS-based measurement for a plurality of UEs, the network may provide CSI-RS configuration and a neighbor cell list per resource to the UEs. Here, the neighbor cell list or the number of CSI-RS resources may be limited in order to reduce signaling overhead. In addition, to prevent periodic broadcasting of CSI-RS configuration, CSI-RS configuration information needs to be provided through UE dedicated RRC signaling. When a UE detects an SSB of a cell which is not included in the neighbor cell list or does not receive CSI-RS configuration, the UE may request CSI-RS configuration for the corresponding cell.

Figure 15:
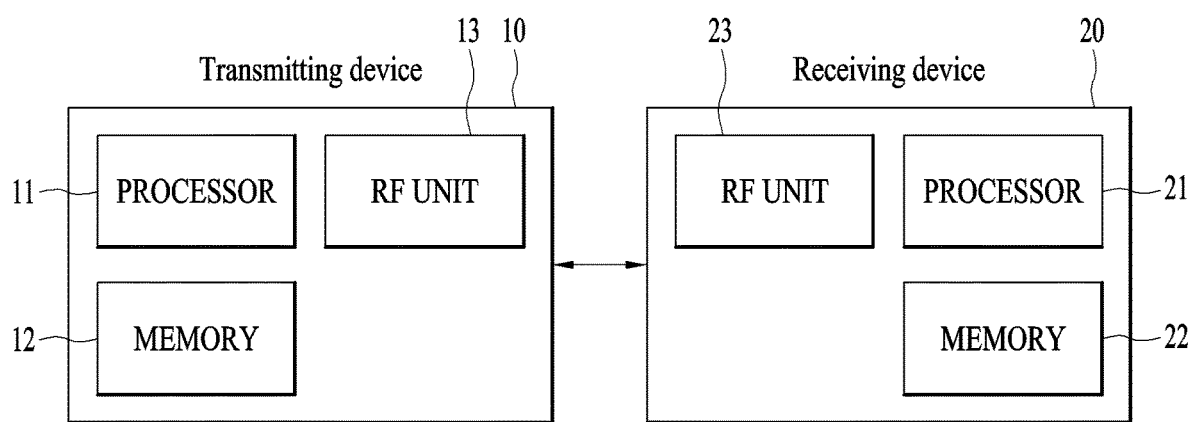
FIG. 15 is a block diagram illustrating components of a transmission apparatus 10 and a reception apparatus 20, for implementing the present disclosure.

FIG. 15 is a block diagram illustrating components of a transmitting device 10 and a receiving device 20 which implement the present disclosure.

The transmitting device 10 and the receiving device 20, respectively include radio frequency (RF) units 13 and 23 which transmit or receive radio signals carrying information/and or data, signals, and messages, memories 12 and 22 which store various types of information related to communication in a wireless communication system, and processors 11 and 21 which are operatively coupled with components such as the RF units 13 and 23 and the memories 12 and 22, and control the memories 12 and 22 and/or the RF units 13 and 23 to perform at least one of the foregoing embodiments of the present disclosure.

The memories 12 and 22 may store programs for processing and control of the processors 11 and 21, and temporarily store input/output information. The memories 12 and 22 may be used as buffers.

The processors 11 and 21 generally provide overall control to the operations of various modules in the transmitting device or the receiving device. Particularly, the processors 11 and 21 may execute various control functions to implement the present disclosure. The processors 11 and 21 may be called controllers, microcontrollers, microprocessors, microcomputers, and so on. The processors 11 and 21 may be achieved by various means, for example, hardware, firmware, software, or a combination thereof. In a hardware configuration, the processors 11 and 21 may be provided with application specific integrated circuits (ASICs), digital signal processors (DSPs), digital signal processing devices (DSPDs), programmable logic devices (PLDs), field programmable gate arrays (FPGAs), etc. In a firmware or software configuration, firmware or software may be configured to include a module, a procedure, a function, or the like. The firmware or software configured to implement the present disclosure may be provided in the processors 11 and 21, or may be stored in the memories 12 and 22 and executed by the processors 11 and 21.

The processor 11 of the transmitting device 10 performs a predetermined coding and modulation on a signal and/or data which is scheduled by the processor 11 or a scheduler connected to the processor 11 and will be transmitted to the outside, and then transmits the encoded and modulated signal and/or data to the RF unit 13. For example, the processor 11 converts a transmission data stream to K layers after demultiplexing, channel encoding, scrambling, modulation, and so on. The encoded data stream is referred to as a codeword, equivalent to a data block provided by the MAC layer, that is, a transport block (TB). One TB is encoded to one codeword, and each codeword is transmitted in the form of one or more layers to the receiving device. For frequency upconversion, the RF unit 13 may include an oscillator. The RF unit 13 may include $N_t$ transmission antennas ($N_t$ is a positive integer equal to or greater than 1).

The signal process of the receiving device 20 is configured to be reverse to the signal process of the transmitting device 10. The RF unit 23 of the receiving device 20 receives a radio signal from the transmitting device 10 under the control of the processor 21. The RF unit 23 may include $N_r$ reception antennas, and recovers a signal received through each of the reception antennas to a baseband signal by frequency downconversion. For the frequency downconversion, the RF unit 23 may include an oscillator. The processor 21 may recover the original data that the transmitting device 10 intends to transmit by decoding and demodulating radio signals received through the reception antennas.

Each of the RF units 13 and 23 may include one or more antennas. The antennas transmit signals processed by the RF units 13 and 23 to the outside, or receive radio signals from the outside and provide the received radio signals to the RF units 13 and 23 under the control of the processors 11 and 21 according to an embodiment of the present disclosure. An antenna may also be called an antenna port. Each antenna may correspond to one physical antenna or may be configured to be a combination of two or more physical antenna elements. A signal transmitted from each antenna may not be further decomposed by the receiving device 20. An RS transmitted in correspondence with a corresponding antenna defines an antenna viewed from the side of the receiving device 20, and enables the receiving device 20 to perform channel estimation for the antenna, irrespective of whether a channel is a single radio channel from one physical antenna or a composite channel from a plurality of physical antenna elements including the antenna. That is, the antenna is defined such that a channel carrying a symbol on the antenna may be derived from the channel carrying another symbol on the same antenna. In the case of an RF unit supporting MIMO in which data is transmitted and received through a plurality of antennas, the RF unit may be connected to two or more antennas.

In the present disclosure, the RF units 13 and 23 may support reception BF and transmission BF. For example, the RF units 13 and 23 may be configured to perform the exemplary functions described before with reference to FIGS. 5 to 8 in the present disclosure. In addition, the RF units 13 and 23 may be referred to as transceivers.

In embodiments of the disclosure, a UE operates as the transmitting device 10 on UL, and as the receiving device 20 on DL. In the embodiments of the disclosure, the gNB operates as the receiving device 20 on UL, and as the transmitting device 10 on DL. Hereinafter, a processor, an RF unit, and a memory in a UE are referred to as a UE processor, a UE RF unit, and a UE memory, respectively, and a processor, an RF unit, and a memory in a gNB are referred to as a gNB processor, a gNB RF unit, and a gNB memory, respectively.

The gNB processor of the present disclosure controls the transceiver to transmit information about a measurement bandwidth for CSI-RS measurement and cell list information about a plurality of cells which are measurement objects and controls the transceiver to map a CSI-RS sequence on the basis of the same reference position configured by a higher layer and to transmit the CSI-RS sequences to a UE. Then, the gNB processor may control the transceiver to receive, from the UE, measurement information about CSI-RS signal strength measured for at least one of the plurality of cells on the basis of the measurement bandwidth. Here, the first element of the CSI-RS sequence is mapped to a subcarrier corresponding to the configured reference position. In addition, the CSI-RS sequence is generated on the basis of a scrambling ID configured by a higher layer and the same reference position, and the information about the measurement bandwidth includes information on a starting RB of the measurement bandwidth.

The UE processor of the present disclosure may control the transceiver to receive information about a measurement bandwidth and cell list information about a plurality of cells and control the transceiver to receive CSI-RSs of the plurality of cells, to measure reception power with respect to the CSI-RSs within the measurement bandwidth and to report reception power of at least one of the plurality of cells. Here, measurement of the CSI-RSs is performed on the assumption that CSI-RS sequences have been mapped to physical resources on the basis of a reference position configured by a higher layer. That is, CSI-RS measurement may be performed on the assumption that the first sequence element of a CSI-RS is mapped to a subcarrier corresponding to the reference position, and the information about the measurement bandwidth may include information about a starting RB of the measurement bandwidth.

The gNB processor or the UE processor of the present disclosure may be configured to implement the present disclosure in a cell operating in a high frequency band at or above 6 GHz in which analog BF or hybrid BF is used.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the above-described method for transmitting and receiving a reference signal and the apparatus therefor have been described based on examples in which the method and the apparatus are applied to 5G NewRAT, the method and the apparatus are applicable to various wireless communication systems in addition to 5G NewRAT.

The invention claimed is:

1. A method for receiving a channel state information-reference signal (CSI-RS) by a user equipment (UE) in a wireless communication system, the method comprising:
   receiving information related to a same reference position used for mapping of CSI-RSs of a plurality of cells;
   receiving information related to a measurement bandwidth for at least one cell among the plurality of cells;
   receiving, from at least one cell, a CSI-RS within the measurement bandwidth; and
   measuring reception power for the CSI-RS,
   wherein sequence elements for the CSI-RS are mapped based on the same reference position, and
   wherein, among the sequence elements for the CSI-RS, one or more sequence elements for the CSI-RS mapped within the measurement bandwidth are received.

2. The method according to claim 1, wherein each first sequence element for each of the CSI-RSs of the plurality of cells is mapped to a subcarrier for the same reference position.

3. The method according to claim 1, comprising reporting information related to reception power of at least one cell.

4. The method according to claim 1, wherein the sequence elements for the CSI-RS are generated based on a scrambling ID of a corresponding cell configured by the higher layer.

5. The method according to claim 1, wherein the information related to the measurement bandwidth includes information related to the starting resource block (RB) of the measurement bandwidth.

6. A user equipment (UE) receiving a channel state information-reference signal (CSI-RS) in a wireless communication system, the UE comprising:
a transceiver for transmitting/receiving signals to/from a base station; and
a processor for controlling the transceiver,
wherein the processor is configured:
to control the transceiver to receive information related to a same reference position used for mapping of CSI-RSs of a plurality of cells;
to control the transceiver to receive information related to a measurement bandwidth for at least one cell among the plurality of cells;
to control the transceiver to receive a CSI-RS from at least one cell within the measurement bandwidth; and
to measure reception power for the CSI-RS,
wherein sequence elements for the CSI-RS are mapped based on the same reference position, and
wherein, among the sequence elements for the CSI-RS, one or more sequence elements for the CSI-RS mapped within the measurement bandwidth are received.

7. The UE according to claim 6, wherein each first sequence element for each of the CSI-RSs of the plurality of cells is mapped to a subcarrier for the same reference position.

8. The UE according to claim 6, wherein the processor controls the transceiver to report information related to reception power of at least one cell.

9. The UE according to claim 6, wherein the sequence elements for the CSI-RS are generated based on a scrambling ID of a corresponding cell configured by the higher layer.

10. The UE according to claim 6, wherein the information related to the measurement bandwidth includes information related to the starting resource block (RB) of the measurement bandwidth.

11. An apparatus for receiving a channel state information-reference signal (CSI-RS) in a wireless communication system, the apparatus comprising:
at least one processor; and
at least one computer memory operably connectable to the at least one processor and storing instructions that, when executed, cause the at least one processor to perform operations comprising:
receiving information related to a same reference position used for mapping of CSI-RSs of a plurality of cells;
receiving information related to a measurement bandwidth for at least one cell among the plurality of cells;
receiving, from at least one cell, a CSI-RS within the measurement bandwidth; and
measuring reception power for the CSI-RS,
wherein sequence elements for the CSI-RS are mapped based on the same reference position, and
wherein, among the sequence elements for the CSI-RS, one or more sequence elements for the CSI-RS mapped within the measurement bandwidth are received.

* * * * *